US010574805B2

(12) United States Patent
Gerace et al.

(10) Patent No.: US 10,574,805 B2
(45) Date of Patent: Feb. 25, 2020

(54) CLOUD-BASED CONTACTS MANAGEMENT

(71) Applicants:Samuel Philip Gerace, Novelty, OH (US); Luke Edward Andrews, Medina, OH (US); Jameson Stephen McMaster, Wadsworth, OH (US); Richard Edward Rothhaar, Venetia, PA (US); Erica Patrice Yesko, Chesterland, OH (US); Christopher Hayden Baran, Rocky River, OH (US); Anthony Arrigo Amantea, Chesterland, OH (US); Ryan Michael Niro, Copley, OH (US); Nicole Lisa Capuana, Euclid, OH (US)

(72) Inventors: Samuel Philip Gerace, Novelty, OH (US); Luke Edward Andrews, Medina, OH (US); Jameson Stephen McMaster, Wadsworth, OH (US); Richard Edward Rothhaar, Venetia, PA (US); Erica Patrice Yesko, Chesterland, OH (US); Christopher Hayden Baran, Rocky River, OH (US); Anthony Arrigo Amantea, Chesterland, OH (US); Ryan Michael Niro, Copley, OH (US); Nicole Lisa Capuana, Euclid, OH (US)

( * ) Notice: Subject to any disclaimer, the term of this patent is extended or adjusted under 35 U.S.C. 154(b) by 0 days.

(21) Appl. No.: 16/117,690

(22) Filed: Aug. 30, 2018

(65) Prior Publication Data

US 2018/0375982 A1  Dec. 27, 2018

Related U.S. Application Data

(63) Continuation of application No. 15/582,379, filed on Apr. 28, 2017, now Pat. No. 10,069,955.

(Continued)

(51) Int. Cl.
*H04M 1/00* (2006.01)
*H04M 1/2745* (2020.01)
(Continued)

(52) U.S. Cl.
CPC ..... *H04M 1/274516* (2013.01); *G06T 7/0002* (2013.01); *H04M 1/27455* (2013.01);
(Continued)

(58) Field of Classification Search
CPC .......... G06T 7/0002; H04M 1/274508; H04M 1/274516; H04M 1/27455;
(Continued)

(56) References Cited

U.S. PATENT DOCUMENTS

2005/0064898 A1* 3/2005 Chambers .......... H04N 1/00127
455/556.1
2005/0085188 A1* 4/2005 Ishii .................. H04M 1/72527
455/41.2

(Continued)

OTHER PUBLICATIONS

Office Action for U.S. Appl. No. 15/582,379 dated Dec. 1, 2017, 24 pages.

(Continued)

*Primary Examiner* — Nathan S Taylor
(74) *Attorney, Agent, or Firm* — Amin, Turocy & Watson, LLP

(57) ABSTRACT

Various embodiments disclosed herein provide for a system for managing and adding contacts. A first mobile device can display an image that can be recorded by a second mobile device. Similarly, the first mobile device can record an image displayed by the second mobile device. The image data from each mobile device can be transmitted to a cloud based contact management system, which can match the images to contact information associated with each mobile device. The contact management system can then push the (Continued)

contact details of each mobile device to the other mobile device, and/or link social media accounts associated with each mobile device. The contact management system can also store connection records that represent an ongoing authorization to push contact information changes from each user to the other, respectively.

20 Claims, 13 Drawing Sheets

Related U.S. Application Data

(60) Provisional application No. 62/329,732, filed on Apr. 29, 2016, provisional application No. 62/466,830, filed on Mar. 3, 2017.

(51) Int. Cl.
*H04W 4/02* (2018.01)
*G06T 7/00* (2017.01)

(52) U.S. Cl.
CPC ..... *H04M 1/274508* (2013.01); *H04W 4/023* (2013.01); *H04M 2203/6009* (2013.01); *H04M 2242/28* (2013.01); *H04M 2250/52* (2013.01)

(58) Field of Classification Search
CPC ..... H04M 2203/6009; H04M 2242/28; H04M 2250/52; H04M 1/72527; H04M 2250/64; H04W 4/023
USPC .......... 455/414.1, 466, 41.2, 556.1, 557, 73
See application file for complete search history.

(56) References Cited

U.S. PATENT DOCUMENTS

| | | | | |
|---|---|---|---|---|
| 2006/0120607 A1* | 6/2006 | Lev | ................... | G06K 9/00624 382/217 |
| 2007/0129959 A1* | 6/2007 | Bransky | ................. | G06Q 10/10 455/73 |
| 2007/0133874 A1* | 6/2007 | Bressan | ................... | G06K 9/03 382/181 |
| 2007/0189501 A1* | 8/2007 | Lai | .................. | H04M 1/274516 379/355.01 |
| 2011/0045852 A1* | 2/2011 | Kovach | ................... | G06Q 30/02 455/466 |
| 2011/0101086 A1* | 5/2011 | Yach | ...................... | G06Q 10/10 235/375 |
| 2012/0191861 A1* | 7/2012 | Bennett | .................. | G06Q 10/10 709/227 |
| 2012/0294495 A1* | 11/2012 | Wren | ................... | G06F 21/6263 382/118 |
| 2012/0294496 A1* | 11/2012 | Nakamoto | ......... | G06K 9/00288 382/118 |
| 2013/0022284 A1* | 1/2013 | Zheng | .................. | G06Q 10/107 382/229 |
| 2013/0195258 A1* | 8/2013 | Atef | ........................ | H04L 67/34 379/88.01 |
| 2013/0227037 A1* | 8/2013 | Wayans | ................... | H04L 65/10 709/206 |
| 2014/0126825 A1* | 5/2014 | Luo | ......................... | G06Q 10/10 382/190 |
| 2015/0339368 A1* | 11/2015 | Gruber | .................. | G06F 16/273 707/613 |
| 2016/0035135 A1* | 2/2016 | Park | ....................... | G06T 19/006 345/633 |
| 2016/0071152 A1* | 3/2016 | Nicklin | .............. | G06Q 30/0255 705/14.16 |
| 2016/0105526 A1* | 4/2016 | Kritt | ..................... | H04L 67/306 709/204 |
| 2017/0012987 A1 | 1/2017 | Gupta | | |
| 2017/0099358 A1* | 4/2017 | Perez | ................. | G06Q 10/0639 |

OTHER PUBLICATIONS

Non-Final Office Action received for U.S. Appl. No. 16/117,662 dated Dec. 28, 2018, 48 pages.

Final Office Action received for U.S. Appl. No. 16/117,662 dated May 1, 2019, 53 pages.

* cited by examiner

CLOUD-BASED CONTACTS MANAGEMENT

RELATED APPLICATION

The subject patent application is a continuation of and claims priority to U.S. patent application Ser. No. 15/582,379, filed Apr. 28, 2017, and entitled "CLOUD-BASED CONTACT MANAGEMENT" which claimed priority to U.S. Provisional Patent Application No. 62/329,732, filed Apr. 29, 2016, and entitled, "CLOUD-BASED CONTACTS MANAGEMENT." This application also claims priority to U.S. Provisional Patent Application No. 62/466,830, filed Mar. 3, 2017, and entitled, "IDENTITY ACCESS MANAGEMENT." The entireties of the foregoing patent application and provisional patent applications are hereby incorporated herein by reference.

TECHNICAL FIELD

The disclosed subject matter relates to a cloud-based contact management system that simplifies adding and managing contacts.

BACKGROUND

Business networking can allow people to make mutually beneficial connections with each other to promote or grow business opportunities, to discover what resources are available, and to find new business partners. Current systems for adding and managing contacts do not take full advantage of mobile devices however, and are not easy to use.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
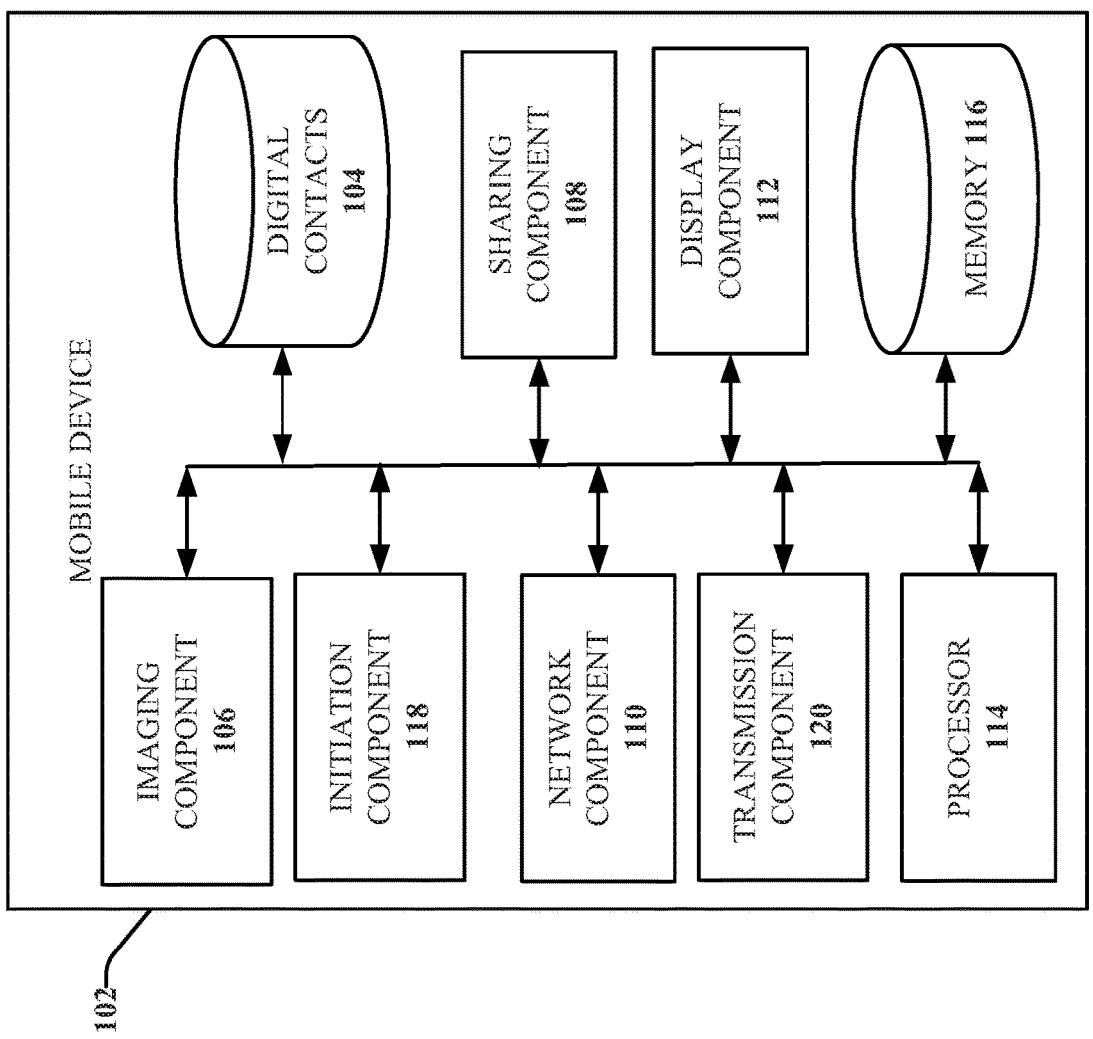
FIG. 1 illustrates an example block diagram of a mobile device contact management system in accordance with various aspects and embodiments of the subject disclosure.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Conventional contact systems (e.g., paper business cards, v-cards, etc.) are cumbersome and static. Implementations described herein provide for unique, flexible, creative and dynamic ways for exchange and retrieval of contact information that is up to date. For example, real-time contact information profiles (e.g., private, business, etc.) can be stored in a cloud, and has a change is made to one or more of the profiles, the updated information is shared (e.g., broadcast, retrieved, etc.) across some or all recipients of the relevant profile. Furthermore, implementations described herein can provide for identifying relevant profile information (e.g., contact information) through digital or audio means. For example, a user can take a picture of another person, and that picture can be analyzed and description data (e.g., a sparse representation of the image) can be generated and transmitted to a server to find a match associated with the description data and retrieve profile information associated with the image. The image can be of the individual, or even a logo or mark worn by the individual. In another implementation, a user can broadcast an RF beacon that can contain the profile information or serve as a description information that can be utilized by a server to retrieve the user's profile information. Additionally, security measures can be provided that prevent an individual from merely taking a picture of someone and retrieving his/her profile information. For example, a digital or audio based handshake can be employed by two or more devices to authenticate individuals and confirm a desire for sharing of profile/contact information. Thus, innovations described herein provide for seamless retrieval of profile/contact information.

In an embodiment, a mobile device can comprise a memory that has stored thereon computer executable components and a processor that executes at least the following computer executable components. The components can include an imaging component that receives first image data from a camera, and analyzes the first image data to generate description data associated with the first image data. The components can also include a network component that transmits the description data to a contact management server and receives first contact data associated with the first image data. The components can also include a sharing component that generates second image data associated with second contact data. A display can be included that displays the second image data.

In another embodiment, a contacts management system can comprise a memory that has stored thereon computer executable components and a processor that executes at least the following computer executable components. The components can include a matching component that matches first description data, received from a first mobile device associated with a first contact account, to a second contact account, wherein the matching indicates a first request to connect. The components can also comprise a confirmation component that determines a second request to connect has occurred, wherein the second request to connect is associated with the second contact account. The components can also comprise a connection component that transfers contact information associated with the first contact account and the second contact account to the second contact account and first contact account respectively.

In another embodiment, a method for managing contacts can include matching, by a system comprising a processor, first description data, received from a first mobile device associated with a first contact account, to a second contact account, wherein the matching indicates a first request to connect. The method can also include determining that a second request to connect has occurred, wherein the second request to connect is associated with the second contact account. The method can also include transferring contact information associated with the first contact account and the second contact account to the second contact account and first contact account respectively.

In another embodiment, a mobile device can comprise a memory that has stored thereon computer executable components and a processor that executes at least the following computer executable components. The components can include an initiation component that receives first initiation data from an antenna, and analyzes the initiation data to generate description data associated with the first initiation data. The components can also include a network component that transmits the description data to a contact management server and receives first contact data associated with the first initiation data. The components can also include a sharing component that generates second initiation data associated with second contact data. The components can also include a transmission component that transmits the second initiation data via the antenna.

In another embodiment, a unidirectional transfer can be enabled, when in the event one user authorizes the transfer of her/his information and a unidirectional transfer of contact information occurs (such that no confirming request from the second party is necessary for the contact information to be transferred from the first). In this case, a second request to connect may not required for information transfer to occur (though in this implementation, two corresponding requests could occur, but they would be treated independently). In another embodiment, bidirectional transfer can be enabled, where both requests are present before authorizing the transfer of information to the respective requesters.

It is to be appreciated that sharing of profile/contact information in accordance with implementations described herein can be bi-directional or uni-directional between parties. For example, a group of individuals at a conference may desire to share and receive contact information across a group of people, while a home-maker may desire to only receive (not share) contact information with a vendor.

It is to be appreciated that in certain implementations the platform can provide for monitoring conversations and when it is determined that sharing of information is desired distribution of contact information can seamlessly occur in the background. For example, if two people are having a conversation, one individual asks "May I have your contact information?" and the other party responds "Yes, and may I have yours as well?" the platform (e.g., utilizing mobile devices, smart eye-wear, etc.) can effect the transfer of contact information in the background without any further action taken by the individuals.

Various embodiments disclosed herein provide for a system for managing and adding contacts. The system replaces the time-consuming, inefficient, and wasteful practice of exchanging business cards, eliminates the need for manual entry of contact information, and adds the comfort of knowing that contact information of other system users are accurate and up-to-date. It also affords users a way to fulfill the social image-projection ritual associated with in-person contact information exchange.

A first mobile device can display an image that can be recorded by a second mobile device. Similarly, the first mobile device can record an image displayed by the second mobile device. The image data from each mobile device can be transmitted to a cloud based contact management system, which can match the images to contact information associated with each mobile device. The contact management system can then push the contact details of each mobile device to the other mobile device, and/or link social media accounts associated with each mobile device. The contact management system can also store connection records that represent an ongoing authorization to push contact information changes from each user to the other, respectively.

Turning now to FIG. 1, illustrated is an example block diagram 100 of a mobile device contact management system in accordance with various aspects and embodiments of the subject disclosure. A mobile device 102 can have a processor 114 and a memory 116 to facilitate execution of various components of the mobile device 102.

The components can include an imaging component 106 that receives first image data from a camera, and analyzes the first image data to generate description data associated with the first image data. The components can also include a network component 110 that transmits the description data to a contact management server and receives first contact data associated with the first image data. The components can also include a sharing component that generates second image data associated with second contact data and a display component that displays the second image data.

In an embodiment, the imaging component 106 can generate a digital image of the image that is representative of a user account or contact data. For example, the image can be a photo of a person, or place, or a personalized and/or unique pattern or other representation associated with the contact data. The imaging component 106 can use any suitable camera (e.g., a front or rear facing camera) of the mobile device 102 to record the image, and then convert the image into a digital format. In an embodiment, the imaging component 106 can analyze the digital image and generate description data of the image to be transmitted to a cloud based contact management system. For instance, description data can be simply just the digital representation of the image in some embodiments, or be the result of some objective analysis performed on the digital image. For example, in an embodiment where the image is a bar code, or QR code, the description data can be the numbers or codes encoded in the barcode/QR code.

The network component 110 can transmit the digital image and/or description data to a cloud based contact management system, and if the contact management system approves the contact request, can receive contact data from the contact management system. The network component 110 can then store the contact data in the digital contact data store 104. The received contact data can also facilitate linking a social media account associated with the mobile device 102 with another social media account associated with the other mobile device.

The sharing component 108 can generate image data to be displayed via the display component 112. The image data generated by the sharing component corresponds to the contact information of the device user. The image data generated by the sharing component 108 can be associated with a social media account or contact information, and be used by the contact management system to transfer contact data to the other mobile device. Different types of image data can be generated by the sharing component 108 based on the profile being shared. For instance, if the people sharing contact information are work colleagues or work contacts, the image can be associated with a work profile, thus sharing only work contact information and/or link work related social media accounts. If the people sharing contact information are friends or family, the sharing component 108 can generate image data associated with a personal profile, thus the contact management system will share the personal contact information and/or link personal social media accounts. At anytime in the future, if both users indicate a change in the relationship, the contact management system can transfer contact data associated with different and/or updated profiles. Business contacts information can include for example professional picture ID, name, professional title, company, company address, company phone, company email, cellular phone, etc. Personal contact information can include for example personal picture ID, name, home address, personal email, personal cellular, and social profile(s). The system may also offer the option of using a temporary profile identity (e.g., an anonymizing, spam-thwarting email address and/or phone number that forward to the user's provided email/phone).

In an embodiment, the network component 110 can perform an autoconnect service, whereby the network component 110 uploads all, or selected contact data from the digital contacts data store 104 to the contact management system. Upon completion of the upload, a user can be prompted by the mobile device 102 to select one or more recipient contract attributes (e.g., email address, text number, social media handle, etc.) in order to send connection requests to their contacts. For each contact that the contact management system determines to be a subscriber, it can automatically create a non-reciprocal, pending connection request. Any time the contact management system does not receive a corresponding connection request within a designated period of time (e.g., in this case because auto-connect is issuing the request), the contact management system will prompt the recipient for confirmation of the sender's connection request. If the recipient responds affirmatively, the contact management system can authorize the sender's connection request and create an approved connection.

If the contact management system determines that a given contact is not a subscriber to the contact management system service, the system can send a message in the channel associated with the contact information provided by the sender containing a quick link for downloading the contact management app and subscribing to the service. Doing so will present the (new) subscriber with the opportunity to authorize the sender's connection request and create an approved connection.

In an embodiment, the mobile device 102 can be executed in whole or in part on two or more related devices working in concert. For example, a smart-watch having both a display and a camera transmits its information through a linked phone. Or, the image capture, display, image processing, and transmission could all occur on different linked devices.

In an embodiment, the mobile device 102 can execute the image lookup by querying a database resident on the mobile device 102. Another implementation is the mobile device 102 itself executing the image lookup by querying a database resident on the device or on a server or both. In another embodiment, the mobile device 102 can send the image to an online cloud server which can perform the search of the database for the image lookup process.

In another embodiment, the imaging component 106 can perform compositing (image combination) to perform identification. Each device would display its image and a composite of the two images to the central service which would authorize a connection if the two composites match.

In another embodiment, the sharing component 108 can enhance the contact management system's ability to differentially recognize images by: embedding encoded information in the photo not discernible to the casual observer, where the encoded information may be a persistent user identifier or may be a transient identifier valid only for a single recognition request; or adding to the image a graphical background or border with encoded information not discernible to the casual observer, where the encoded information may be a persistent user identifier or may be a transient identifier valid only for a single recognition request.

In another implementation, the mobile device 102 can augment requests with location data to limit the set of candidate images considered by the matching algorithm or augment requests with time data to limit the set of candidate images considered by the matching algorithm or augment requests with location and time data to limit the set of candidate images considered by the matching algorithm. In other embodiments, the requests can be augmented with local radio frequency methods (e.g., Bluetooth, Wi-Fi, NFC, etc.) to limit candidates considered by the matching algorithm or use audio information (e.g., instead of image recognition) to perform identification by using the devices' speakers/microphones (e.g., instead of the screen and camera). Audio may be in the range of human perception, outside the range of human perception, or both. Each device would play a user-selected audio clip and listen for the other clip, performing audio subtraction if necessary to remove its own clip. Each device would perform the same analysis, description, and transmission to the service.

In another embodiment, the mobile device 102 can play a frequency or series of frequencies, and listen for an interaction pattern with the other mobile device. Both devices can convey the resulting harmonious/discordant sound combination to the contact management service which would authorize a connection if it receives matching waveforms from the two devices.

In another embodiment, the mobile device 102 can use microphone/speakers of the mobile device 102 to begin a sequence playing a random frequency while listening for the other frequency and iteratively alternating their own frequency toward the other, "negotiating" to a common frequency that serves as the identifier. Other effects may be added to the process to make it aurally interesting to users and nearby listeners, (ex. each device playing notes of a chord based on the common frequency).

Another implementation is the use of encoded audio information using the devices' speakers/microphones to transmit an identifier to the other device. Audio may be in the range of human perception, outside the range of human perception, or both. Encoded audio information may be imperceptibly embedded in a user-selected audio clip. A device would decode the identifier and transmit a request to the service with its own and the decoded identifier, which would authorize a unidirectional or bidirectional connection and/or exchange of contact information. The service can require a confirming request from the device associated with the decoded identifier.

Another implementation would employ voice-recognition. If two users are on a voice call and desire to exchange contact information, user 1 can activate a voice recognition feature in a contact management system related app on the mobile device 102. User 2 can speak his/her name. The contact management system app can listen to user 2, developing a wave form that is compared to a stored waveform in a database to establish a connection.

Another implementation is maintaining a real-time geo-specific cache of image descriptions for proximate users on each mobile device (e.g., mobile device 102). This can facilitate rapid image lookup on the device, with subsequent access of a central service if the image is not found in the device's proximate-user cache.

Another implementation is maintaining a real-time geo-specific cache of description data for proximate users on each mobile device (e.g., mobile device 102). This can facilitate rapid description data lookup on the device, with subsequent access of the central service if the description data is not found in the device's proximate-user cache In an embodiment, instead of receiving image data via a camera to initiate a connection, the mobile device can receive a transmission (e.g., via local radio frequency methods (e.g., Bluetooth, Wi-Fi, near-field communications (NFC), ultrasonic, etc) comprising initiation data. An initiation component 118 can receive the transmission, generate description data from the transmission, and initiate a connection request using that description data generated. Similarly, the mobile device can send, via an antenna and transmission component 120, second initiation data to another mobile device. In this way, mobile devices can connect using RF or ultrasonic means, instead of employing the camera as described above.

The mobile device can use low energy bluetooth (BLE) to transmit the initiation data, where BLE is a wireless personal area network technology used for transmitting data over short distances (e.g., up to 100 meters). A beacon broadcast can broadcast one or more parameters (ex.:

1) Region ID—a GUID comprised of 36 alpha-numeric digits and used to define the sourced beacon;
2) Major—a 16-bit data value, supporting unsigned integers between 0 and 65535;
3) Minor—a 16-bit data value, supporting unsigned integers between 0 and 65535; or
4) Tx Power—used to determine proximity (distance) from the beacon.)

A mathematical algorithm can translate an internal identifier for a persona into parameter values (e.g., description data). Parameter values are assigned to the persona and used for broadcast and contact information lookup, initation, and connection. Ranging is a defined term for "listening" for a beacon broadcast. The system can define a set of "privacy radius" distances that are used to bound the ranging in support of different use cases; shorter "privacy radius" distances for intimate peer-to-peer exchanges, longer "privacy radius" distances to support meeting modes where multiple persons are exchanging their contact information with one another or with a meeting manager.

To share contact information, a user can first select the persona they wish to share, then select a user-interface element associated with sharing. This initiates the broadcast of a beacon (e.g., sharing the parameter values) that is Ranged by other users. The duration of the broadcast can be continuous or the shorter of a time taken to acknowledge receipt of the broadcast, connection, or a system defined time-out.

"Ranging is performed for beacons containing specific information contained within the BLE transmission, or information about the signal itself, or the result of some objective analysis performed on the signal or the information contained in the transmission, or any combination of these. The duration of ranging may be unlimited or may be limited by application settings, system-determined values, user preferences, or user interface actions.

Once a beacon is ranged by an intended recipient, details of received parameters (e.g., region id, major & minor values) are sent to a cloud service layer for processing, or in the absence of a network connection are cached on the device and transmitted to a cloud service layer upon reestablishment of a network connection. The cloud service layer may select the appropriate persona associated with the parameter data. It may then: 1) establish a one-way or two-way connection with the receiving user if no previous connection exists; 2) update the connection with the new persona id if a connection already exists between the sender and the receiver; or 3) send the persona contact details of the originating user to the receiving user's device, completing the process.

If two or more beacons are ranged within a given "privacy radius", the contact management app may optionally: 1) select and use the closest beacon; 2) prompt the users to isolate themselves and retry the connection; or 3) use another objective analysis method to select a specific beacon.

Several meeting mode variations are contemplated. In general, the "privacy radius" may be extended to satisfy reasonable boundaries of those attending a meeting. For example, in a first mode, intended for more formal business settings—a meeting coordinator defines a named meeting into which attendees can check in. This action may 1) place the app into meeting mode; 2) extend the "privacy radius" to a distance sufficiently broad to range any attendee sharing a persona to check into the meeting; 3) range for and record the persona shared by meeting attendees; and/or 4) establish connections and share personas among meeting attendees at any point during or after the meeting.

A second mode, likely used for informal gatherings, where multiple meeting attendees all desire to exchange persona information without checking into a formally defined meeting. Individual meeting attendees can place the contact management app into a meeting mode which may: 1) temporarily extend the "privacy radius" to a distance sufficiently broad to range any attendee sharing a persona; 2) exchange the distinct personas shared by all meeting attendees ranged within the designated period; and/or 3) after expiry of the temporary period, return the "privacy radius" to a distance appropriate for intimate peer-to-peer exchanges.

It is to be appreciated that in certain implementations one or more of the components described herein can employ machine learning component that facilitates inferring, determining or predicting acts and actions to be taken in accordance with embodiments described herein. For example, in an embodiment, a mobile device can comprise a memory that has stored thereon computer executable components and a processor that executes at least the following computer executable components. The components can include an imaging component that receives first image data from a camera, and analyzes the first image data to generate description data associated with the first image data. The analysis of the first image data can employ machine learning in connection with generating description data associated with the first image date. The components can also include a network component that transmits the description data to a contact management server and receives first contact data associated with the first image data. The components can also include a sharing component that generates second image data associated with second contact data. These acts can also leverage machine learning in connection with various decision-making processes, acts taken, resources utilized, etc.

Inferences described herein can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Accordingly, based on respective values, historical data as well as contextual data the system can employ artificial intelligence in connection with a probabilistic-based analysis to infer, determine or predict acts or actions to be taken. Moreover, a utility-based analysis can be employed where the cost of making an incorrect inference, determination or prediction can be weighed against the benefit of making a correct inference, determination or prediction.

Thus, for example, through use of machine learning the system can converge over time on taking action preferred by a user in connection with sharing, updating, categorizing contact data as well as filtering, purging and not sharing data. The machine learning can also facilitate taking automatic action with respect to various acts described here, and afford for passive implementation of operations in the background as desired by the user.

Figure 2:
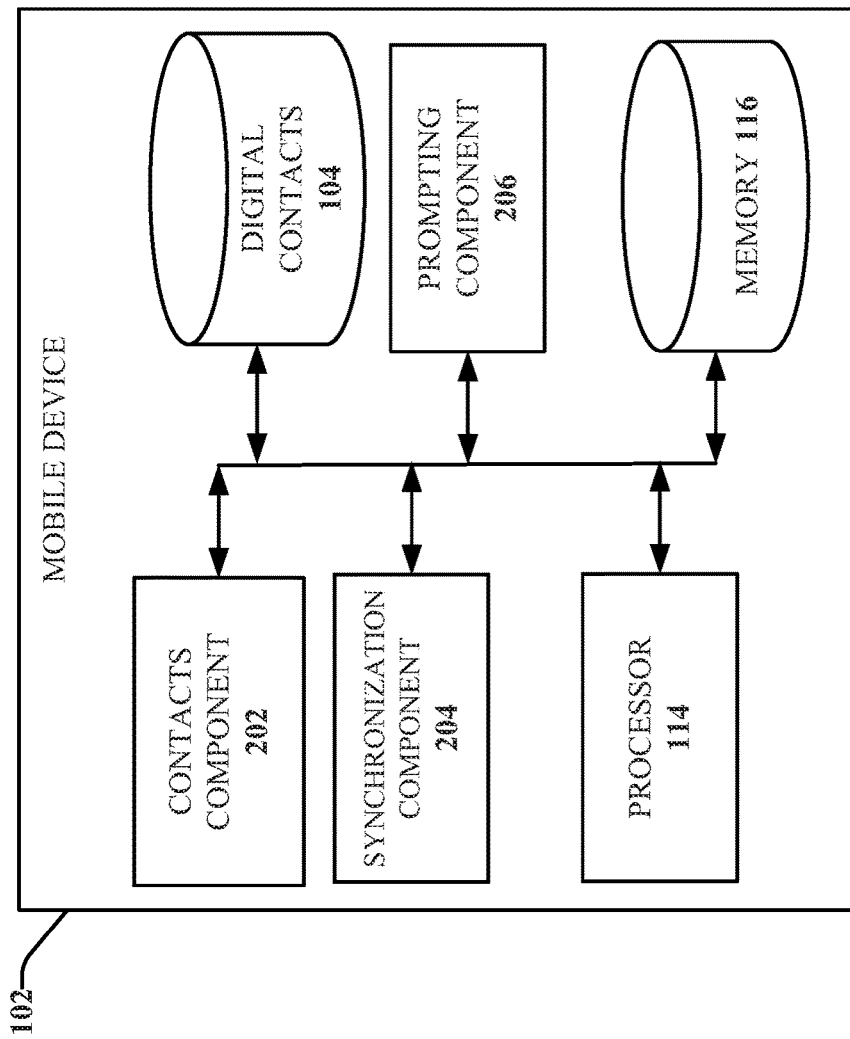
FIG. 2 illustrates another example block diagram of a mobile device contact management system in accordance with various aspects and embodiments of the subject disclosure.

FIG. 2 illustrates a block diagram 200 of a mobile device contact management system in accordance with various aspects and embodiments of the subject disclosure. The mobile device 102 can also include a contacts component 202 that can update the digital contacts 104 when receiving updates from the contact management system. Whenever a profile relationship is changed, or a user updates or changes his/her contact information, that contact information can be updated in the cloud based contact management system, and be pushed to the mobile devices (e.g., mobile device 102). In other embodiments, once a relationship has already been formed between mobile devices and/or their respective accounts, contact data can be updated by peer to peer connections (e.g., Bluetooth, Wi-Fi, IR, NFC, and etc.).

In an embodiment, the contacts component 202 can also be used to access contact connections from within an app on the mobile device 102 or via a web service to initiate individual live communication in a preferred channel (e.g., peer to peer/video call, phone, email, social media, etc.) or enable bulk operations such as for example scheduling meetings, printing Christmas card labels or emailing vacation photos to the entire family. The contacts component 202 can also enable contact attributes maintained by a subscriber about another connected subscriber that are not shared—non-limiting examples include: relationship type(s); friend; business associate; client; family member; or connection importance (e.g., how central is a relationship to business matters), etc.

When contact attribute changes are made by connected contacts, the contacts component 202 can alert a user to important contact changes made by his/her contacts. For example, the contact management app may display a notification when a contact updates his/her address. The contact management system may provide a search interface to display all family members having changed their home address in a defined time period. The contacts component 202 can also allow users to see their strength as a connector of other subscribers, and to see the strength of other subscribers as connectors. it will use one or more algorithms to assess a user's connection strength based on their history of introductions and forwards. In other embodiments, the contacts component can also allow users to directly access their respective contact information and annotate it through the app and/or through the cloud based contact management system service if they do not wish to consult (or do not use) another repository.

A synchronization component 204 can be provided to synchronize contact information in a first contact repository and a second contact repository based on the first contact data. The synchronization component 204 can enable synchronization of contacts between multiple contact platforms. It may offer this feature regardless of whether the contact is a subscriber. It can analyze and propagate disparate contacts to all repositories and periodically keep those contacts synchronized with one another if a contact is entered or updated in a non-connected repository. In cases where there is no contact ambiguity between platforms, the service may synchronize those contacts using fully automated mechanisms. It may alternatively prompt a user to discretely determine if two contacts should be synchronized and if so, which attribute(s) should supersede.

A prompting component 206 can be provided to send a prompt in response to determining that another mobile device or contact is within a predefined range and is separated from one of the existing contacts by a predefined number of relationships. (e.g., contacts of your existing contact). In at least one embodiment, the prompt can be delivered via an optical head mounted display device (e.g., using augmented reality to generate an overlay indicating which mobile device is a subscriber) or any other linked device (e.g., other wearable devices).

Figure 3:
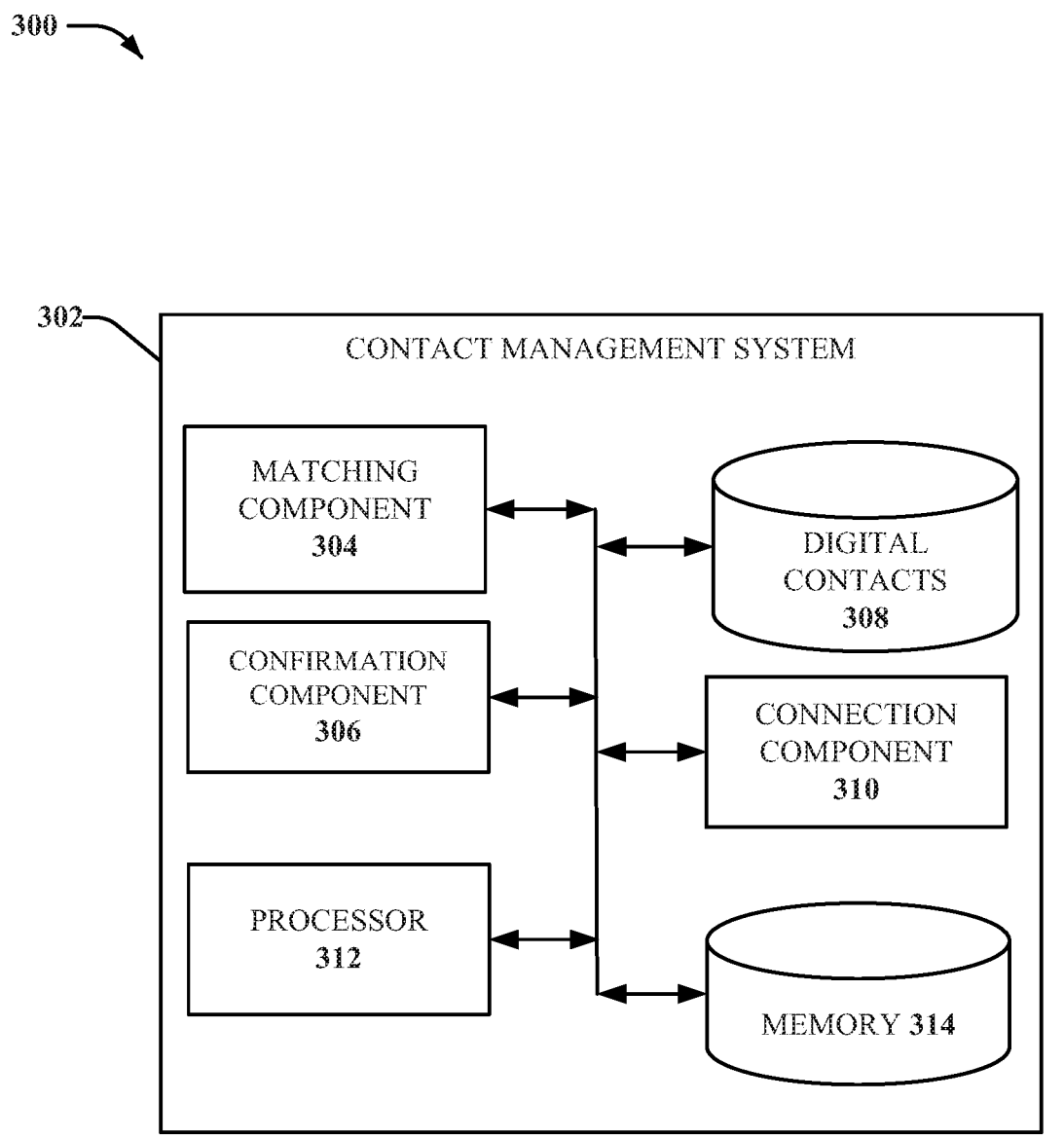
FIG. 3 illustrates an example block diagram of a cloud based contact management system in accordance with various aspects and embodiments of the subject disclosure.

Turning now to FIG. 3, illustrated is an example block diagram 300 of a cloud based contact management system 302 in accordance with various aspects and embodiments of the subject disclosure. Contact management system 302 can correspond to the contact management system referred to in FIGS. 1 and 2. Contact management system 302 can have a processor 312 and a memory 314 to facilitate execution of various components of the contact management system 302.

The components can include a matching component 304 that matches first description data, received from a first mobile device (e.g., mobile device 102) associated with a first contact account, to a second contact account, wherein the matching indicates a first request to connect using the contact data in a digital contacts data store 308. The components can also include a confirmation component 306 that determines a second request to connect has occurred, wherein the second request to connect is associated with the second contact account. The components can also include a connection component 310 that transfers contact information associated with the first contact account to the second contact account and/or contact information associated with the second contact account to first contact.

The confirmation component 306 can determine that the second request to connect has been received in response to receiving image data associated with the first contact account from a second mobile device associated with the second contact account. Thus, the connection is made, and the contact details are shared when both mobile devices capture pictures of the other's respective images and upload them to the contact management system 302.

In some embodiments, however, the confirmation component can confirm the second request even when only one of the mobile devices have a camera. For instance, the contact management system 302 can confirm the first contact request using the image data received from the first device, and matching the image data to a second contact account, which will create a pending connection to the camera-less second account. Any time the service does not receive a corresponding connection request within a designated period of time (in this case because one user does not have a camera), the confirmation component 306 can send a request for confirmation of the connection request to the camera-less user. If the camera-less user responds affirmatively, the service will create the reciprocal connection and allow the connection component 310 to push the respective contact data to the mobile devices.

Similarly, the confirmation component 306 can enable a user to initiate a connection with a contact with whom they are actively speaking, who is not physically proximate or where neither device has a screen-facing camera. Using this feature, a sender can request an identification code from the contact management system 302 and communicate the identification code to a recipient. Doing so will generate a pending connection request associated with that number and the recipient. If the recipient is a subscriber, he/she will enter the identification code in their contact management app on their mobile device to generate a corresponding pending connection request associated with the identification code. The contact management system 302 will match the corresponding pending connect requests using the identification code and then authorize both connections.

In a case where the recipient is not a subscriber, the recipient can enter the sender provided identification code into the service webpage, having the effect of authorizing the sender's connection request and then providing the opportunity to subscribe to the service and download the contact management app. Alternatively, the recipient can text the sender provided identification code to an SMS short code. The contact management system 302 can authorize the sender's connection request and respond with an SMS message containing a quick link for downloading the contact management app and subscribing to the service.

When both mobile devices are unable to transmit the image data to the contact management system 302 due to unavailable or unreliable network connectivity, the mobile device app can alert the users of the connection failure and instead perform a minimal profile exchange via short range Bluetooth communications. The users' mobile devices can cache the other device's on screen image capture, along with the date/time of the offline initiation and intended connection profile. When the contact management app detects a restoration of internet connectivity, it can relay the on-screen image, initiation date/time and connection profile to the centralized contact management web service for lookup of a reciprocal request made at the same approximate time. If a corresponding reciprocal request is found, the service can authorize each sender's connection request creating reciprocal approved connections.

In an embodiment, the mobile device can also to initiate a connection request with a contact when a sender enters a unique recipient contact attribute (e.g., email address, text number, social media handle, etc.). If the contact management system 302 determines that the contact is a subscriber, the service will create and issue a (non-reciprocal) pending connection request to that subscriber. Any time the service does not receive a corresponding connection request within a designated period of time (e.g., in this case because the request is initiated by a single user), the contact management app may prompt the recipient for confirmation of the sender's connection request or may automatically complete the connection, or ignore the request. If the recipient responds affirmatively, the service may authorize the sender's connection request and establish a reciprocal approved connection. If the recipient is not a subscriber, the system may send a message in one or more channels associated with the contact information provided by the sender containing a quick link for downloading the contact management app and subscribing to the service. Doing so will present the (new) subscriber with the opportunity to authorize the sender's connection request and create a reciprocal approved connection.

Figure 4:
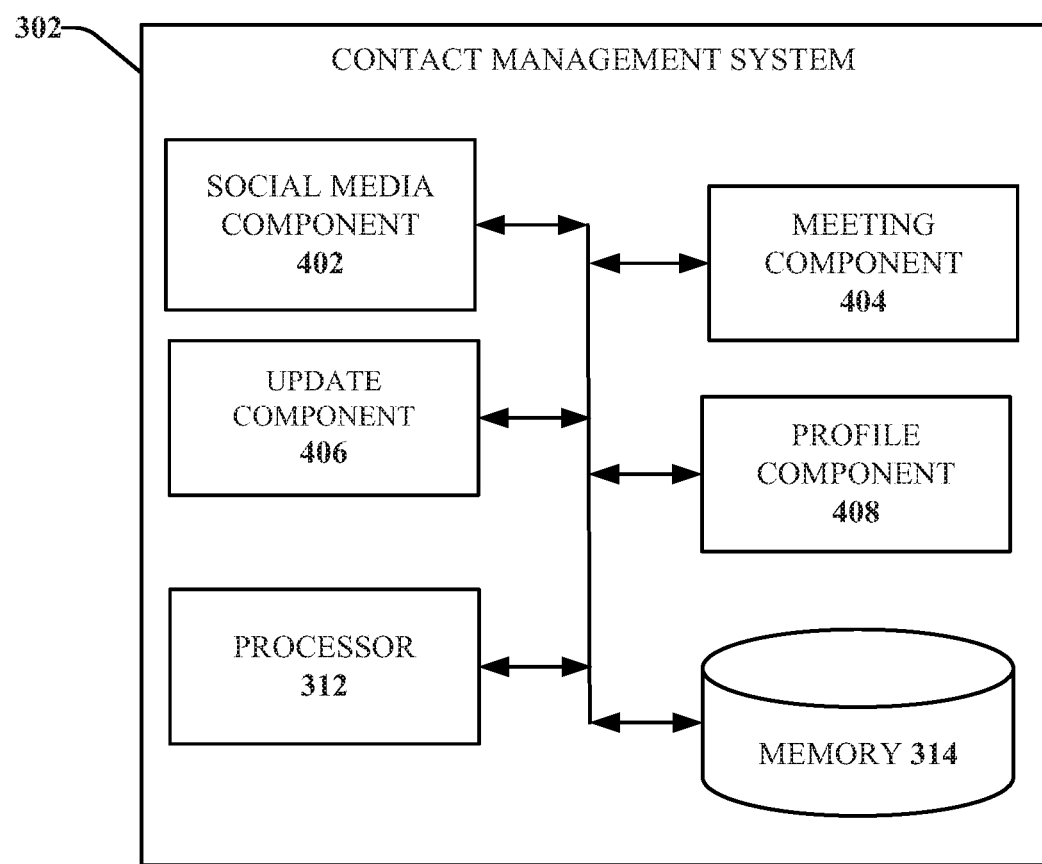
FIG. 4 illustrates another example block diagram of a cloud based contact management system in accordance with various aspects and embodiments of the subject disclosure.

Turning now to FIG. 4, illustrated is another example block diagram 400 of a cloud based contact management system 302 in accordance with various aspects and embodiments of the subject disclosure. In the embodiment shown, the contact management system 302 can include a social media component 402 that facilitates linking a social media account associated with the first contact account to a social media account associated with the second contact account. A meeting component 404 is also provided to determine, based on schedule data, that the first contact account and the second contact account have a meeting in common with a third contact account, and transfer the contact information to the third contact account. The contact management system 302 can also include an update component 406 that transmits updated contact information associated with the first contact account to the second contact account in response to contact information of the first contact account being altered. The contact management system 302 can also include a profile component 408 that determines that the first description data is associated with a profile of the second contact account, wherein the profile is associated with a subset of contact information of the second contact account, the result of which may be the connection component 310 transferring a subset of contact information of the second contact account to the first contact account.

The meeting component 404 can also facilitate automatically displaying a list of nearby subscribers (e.g., including any contact information like image, name, company, etc.) with whom a user is connected, whereby proximity is detected by the user's device directly based on any suitable combination of visual recognition, audio recognition, or RF recognition of the devices of nearby subscribers or subscriber devices.

The meeting component 404 can also facilitate automatically displaying a list of nearby subscribers (e.g., including any contact information like image, name, company, etc.) with whom a user is connected, whereby proximity is detected by a cloud service using location information (e.g., GPS, local network identification information) transmitted to it by the user's device and the nearby subscriber's devices In an embodiment, the social media component can link social media accounts associated with the first and the second contacts, or can link the social media accounts based on the profile. For instance, if the profile component 408 shares personal contact info, the personal social media accounts can be linked, whereas if the profile component 408 shares work contact data, then work social media and other professional accounts can be linked.

The social media component 402 can also enable social graph tools that can identify strong social circles (e.g., based on existence of interconnections between groups of users) for the purpose of facilitating external use of the social graph for business to business, business to client, client to client tasks. (e.g., to assess strength of a sales department's aggregated social graph; to solicit an introduction to an individual with whom the user is not connected). The social media component 402 can offer tools to act on the relationships, or to track relationships over time. The social media component 402 can offer "smart group" relationship tools that automatically select (e.g., in-bulk or individually as contacts are added) individuals in a user's social graph conforming to a set of user-defined characteristics. The social media component 402 may offer tools that allow users to view and display their social graphs. The social media component 402 may offer API access to post social graph data on $3^{rd}$ party sites or services. The social media component 402 may allow a user to empirically and/or comparatively assess the strength of their social graph by quantifying aspects of a user's social graph (e.g., size, breadth, activity, diversity) and calculating "strength" scores. The social media component 402 may offer tools that allow users to act on their social graphs. The system may offer API access to exchange social graph data with third-party (ex. marketing and sales) solutions.

The social media component 402 can also offer API services to support automatic permissioning on $3^{rd}$-party platforms for individuals within a referenced user's social graph. For example, a user could allow a first-degree contact to see their free/busy time on their calendar; a user could auto-accept meeting requests from any first-degree contact; a user could white list email from any $<4^{th}$ degree contact.

In addition, the social media component 402 can offer an application programming interface (API) to allow $3^{rd}$ parties to identify contacts within a given user's social graph. For example, because consumer recommendations are considered material influences for considered purchases, a given merchant would wish to display references from people within a given prospect's social graph, as they would be deemed most influential, e.g., when a user visits an automobile manufacturer's website, the manufacturer would make an API call to determine whether it had recommendations from people in the user's social graph, and to query information on the strength of the connections. It would make its recommendation display decisions using that information.

In an embodiment, the profile component 408 can enable attributes of its own contact profile to be updated, and optionally enable context based system features. For instance, changes to home address contact attributes can then be used to issue reminders to the user that they should complete a change of address form with the US Postal Service (USPS). The profile component 408 can also capture data collected by the USPS and submit that data to the USPS on behalf of the user. Likewise, a change of home address may invoke a new movers service providing information to local merchants and national service providers in exchange for discounted products and services. Similarly, changes to work profile information can be propagated to work contacts, and can prompt to issue, or automatically send emails to all or selected contacts having the work profile affixed to an authorization record.

In an embodiment, the profile component 408 can facilitate interaction with service providers (e.g., small appliance repair shop and corporate vendors), the system can allow a subscriber to identify his/herself as a service provider. The profile component 408 can provide for display or transmission of persistent, unique data description and/or identifying image via device and/or in printed form so that a user wishing to connect with and utilize the service provider profile can receive or scan the service provider's data description or image; enter the service provider's identification code into the app; or text the service provider's identification code to a designated SMS short code. The profile component 408 can then create unidirectional or bidirectional connections between the user and the service provider without requiring a corresponding connection request from the service provider (e.g., use of the service provider designation by the service provider can be deemed an implicit connection request from the service provider).

A user can refer to their service provider profile to sign-in or identify themselves as a member of a loyalty program (e.g., hotel rewards, grocery frequent shopper, etc.). A quick-recall feature can be enabled that allows a user to quickly recall loyalty program ID numbers and display them. The profile component 408 can also enable a user to identify a particular change in their contact information that they wish to have highlighted to connected users through an app notification.

The meeting component 404 can keep track of meetings, schedules, and other calendar information and use the information to facilitate easy transfers of contact information in groups. As an example, in a typical meeting of 10 people, 90 business cards are typically exchanged. The contact management system 302 can enable all meeting attendees to be connected with only nine initiations using the meeting profile manager. As each attendee arrives, she/he needs only to connect with any one of the other attendees having already joined the meeting. The contact management system 302 can create connections between the entire graph of users (e.g., at any degree of connection) who initiated using the meeting profile. The meeting component 404 can also record attendance at meetings and disseminate to all attendees an event summary showing all attendees, duration, location, attendees, arrival times, slide decks, documents, images, and other information. The meeting component 404 can also continuously display a list of attendee names and images of people who have initiated with the meeting profile manager.

Figure 5:
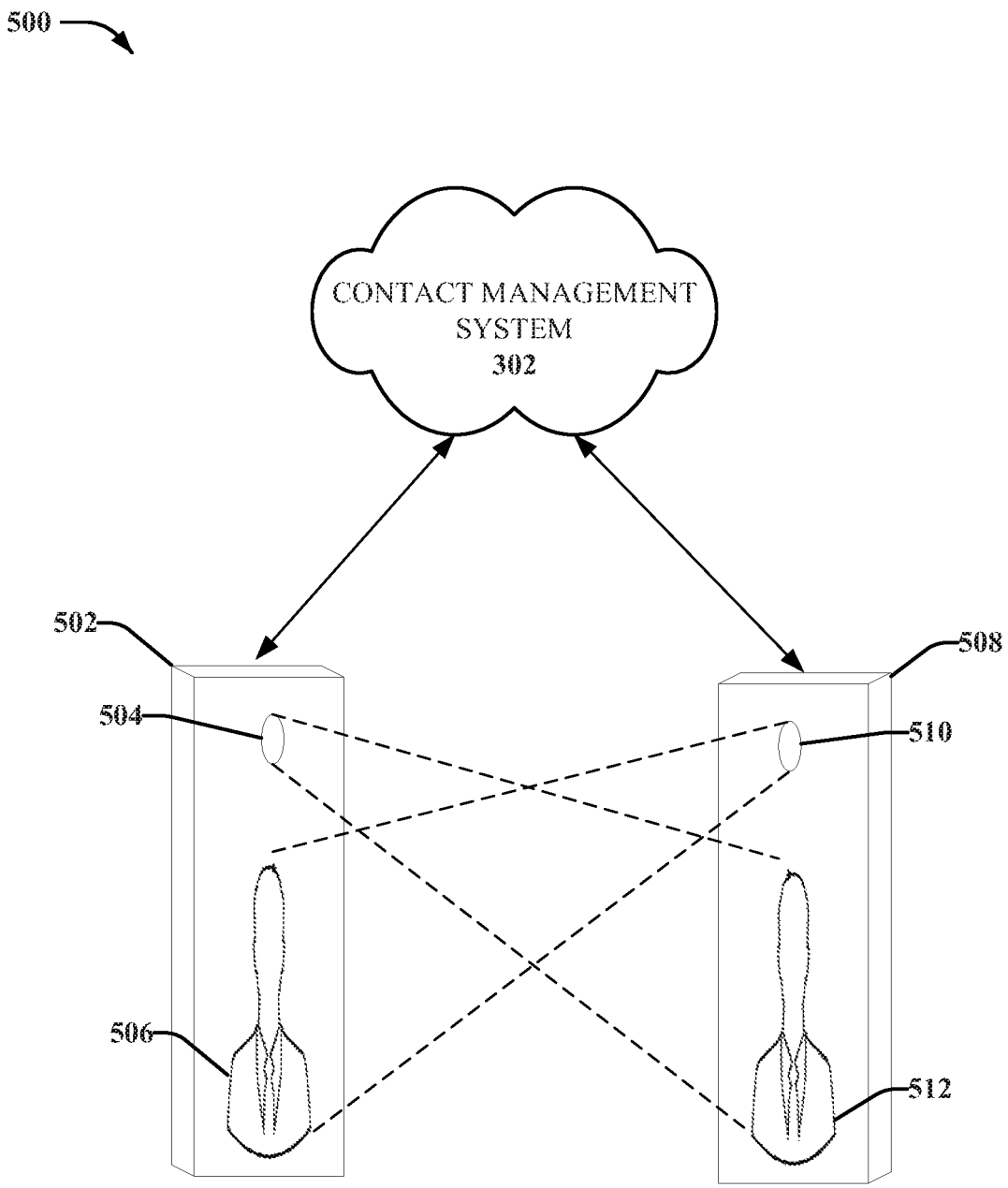
FIG. 5 illustrates an example block diagram of mobile devices that can facilitate transferring contact data in accordance with various aspects and embodiments of the subject disclosure.

Turning now to FIG. 5, illustrated is an example block diagram 500 of mobile devices 502 and 508 that can facilitate transferring contact data in accordance with various aspects and embodiments of the subject disclosure. The embodiment depicted can be a visual representation of how mobile devices can be used to share contact information. A first mobile device 502 can display an image 506 that a front facing camera 510 on a second mobile device 508 can record. Similarly, mobile device 508 can display an image 512 that a front facing camera 504 on mobile device 502 can record. Each of mobile devices 502 and 508 can transmit image data, or description data about the images to the contact management system 302.

The contact management system 302 determines that the image data of image 506 corresponds to a subscriber account associated with mobile device 502 based on performing an image analysis and matching it to stored image and contact data. Similarly, the contact management system 302 can determine that the image data of image 512, received from mobile device 502 corresponds to the subscriber account associated with mobile device 508. The image transfers and matching performed by the contact management system 302 can each be respective requests to connect. When the contact management system 302 determines that the requests to connect have been received from the respective subscriber accounts, the contact management system 302 can create an authentication record linking the two subscribers, and push the contact data associated with each subscriber account to the other mobile devices.

In an embodiment, the images 506 and 512 can correspond to respective profiles, e.g., work profile, personal profile, etc., and the contact data pushed by the contact management system 302 to the mobile devices can correspond to the contact data associated with the respective profiles. Different images can correspond to different profiles. For instance, mobile device 502 can have a set of images, with each image corresponding to a different profile, and each profile can have a different subset of contact data associated with the profile selected from a set of contact data. The contact management system 302 can differentiate between the images to determine which profile is being used to connect, and therefore which subset of contact data to push to mobile device 508. It is to be appreciated that while the images 506 and 512 shown in FIG. 5 are images of people, in other embodiments, the images corresponding to the profiles and/or subscriber accounts can be other images, e.g., symbols, barcode/QR codes, photographs, etc.

It is also to be appreciated that either of the mobile devices 502 or 508 can use rear facing cameras in addition to the front facing cameras 504 and 510 shown in FIG. 5. For instance, if mobile device 502 only had a rear facing camera, then mobile device 508 can capture the image 506 using front facing camera 510, and then mobile device 502 can be turned around and the rear facing camera can be used to capture image 512.

Figure 6:
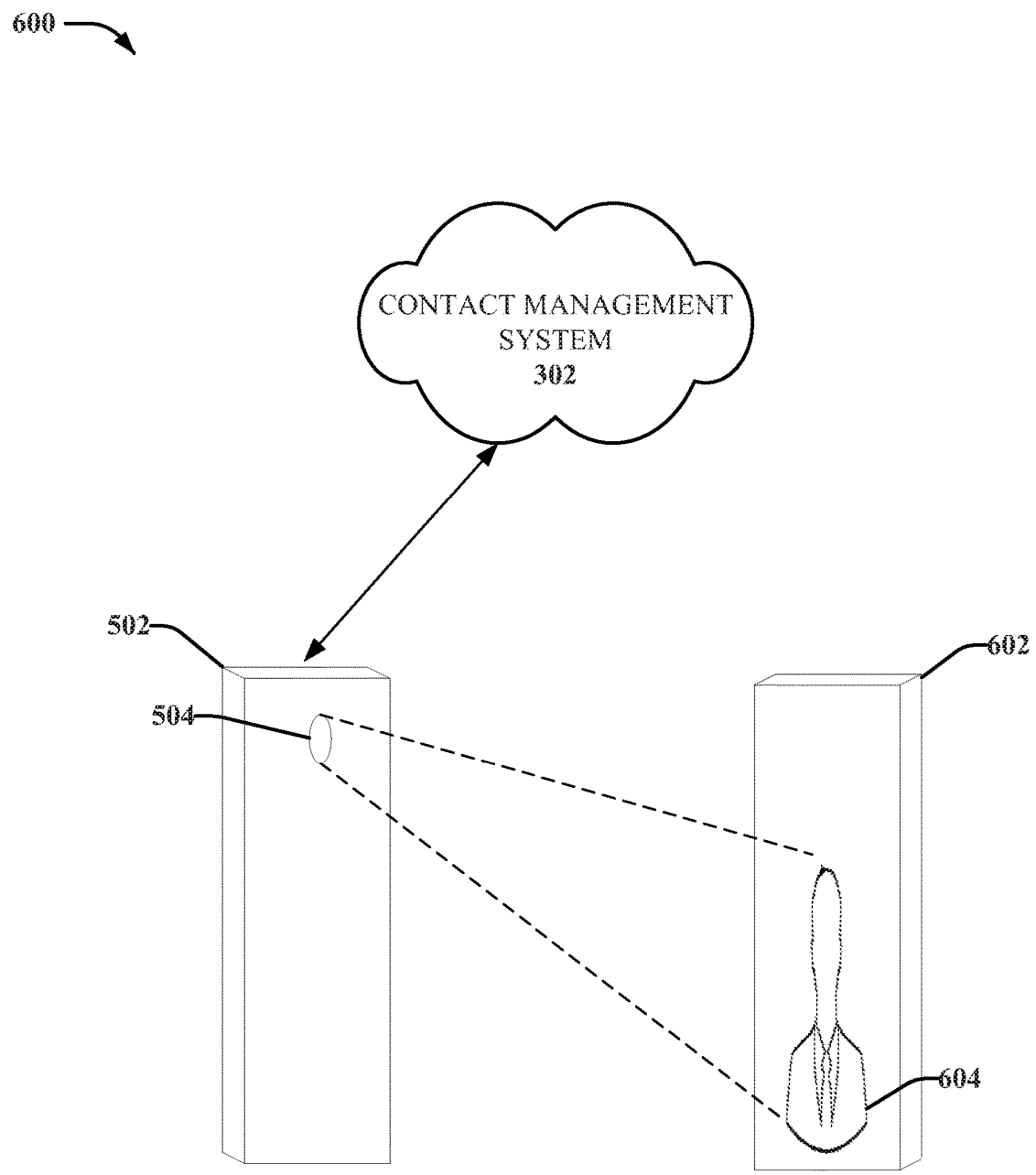
FIG. 6 illustrates an example block diagram of mobile devices that can facilitate transferring contact data using a single mobile device in accordance with various aspects and embodiments of the subject disclosure.

Turning now to FIG. 6, illustrated is an example block diagram 600 of mobile devices that can facilitate transferring contact data using a single mobile device in accordance with various aspects and embodiments of the subject disclosure. In the embodiment shown, mobile device 602 may not have any camera, or may lack network connectivity. Mobile device 502 can then use camera 504 to capture image 604 on mobile device 602, and transmit the image data to contact management system 302.

For instance, the contact management system 302 can confirm the first contact request using the image data received from the mobile device 502, and matching the image data to a second contact account, which will create a pending connection to the camera-less second account associated with mobile device 602. Any time the service does not receive a corresponding Connection Request within a designated period of time (in this case because one user does not have a camera), the contact management system 302 can send a request for confirmation of the Connection Request to mobile device 602. If the mobile device 602 responds affirmatively, the service will can the reciprocal connection and allow the contact management system 302 to push the respective contact data to the mobile devices 502 and 602.

Figure 7:
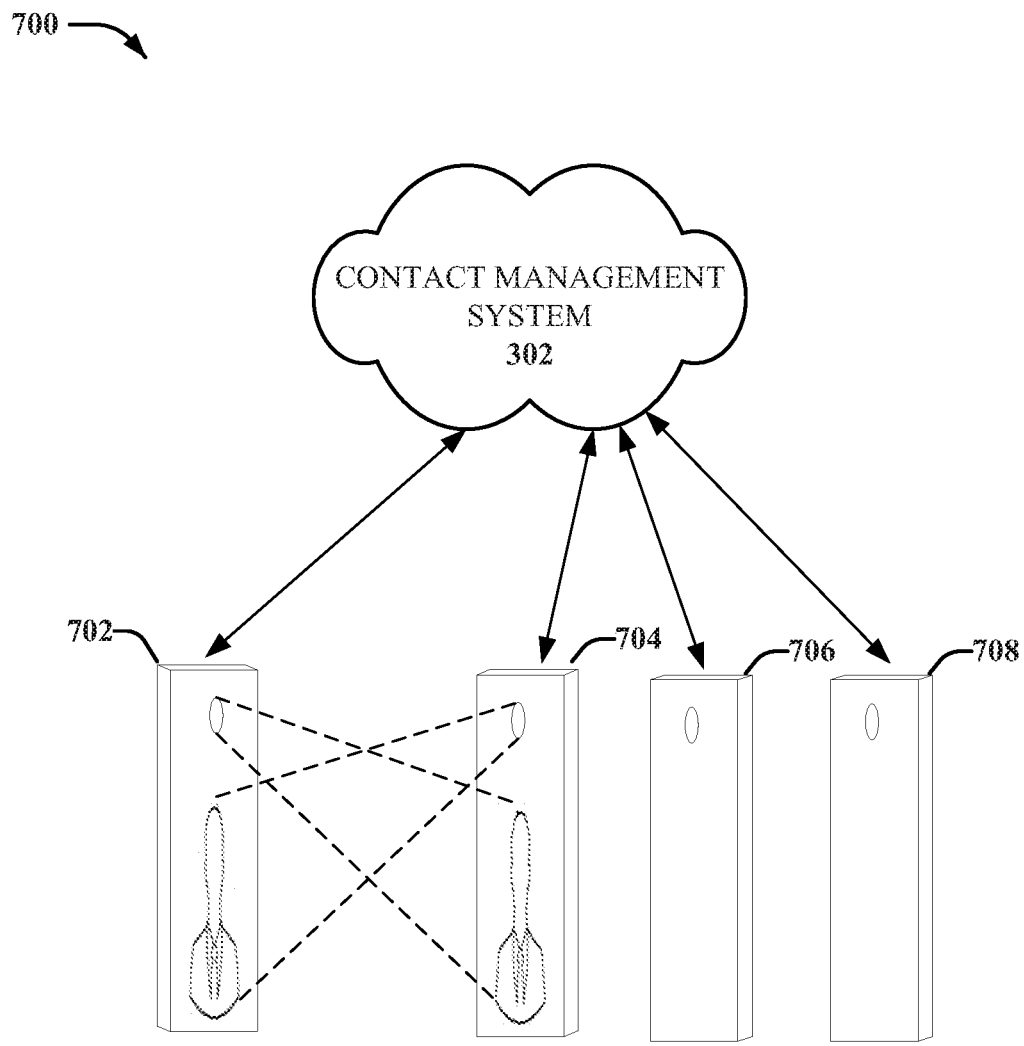
FIG. 7 illustrates an example block diagram of a mobile device transferring contact data to a group of mobile devices in accordance with various aspects and embodiments of the subject disclosure.

Turning now to FIG. 7, illustrated is an example block diagram 700 of a mobile device transferring contact data to a group of mobile devices in accordance with various aspects and embodiments of the subject disclosure. In an embodiment, if mobile devices 704, 706, and 708 are associated with subscriber accounts that are part of a group (e.g., team, colleagues, meeting partners, etc) in response to successfully forming a connection between the mobile device 702 and 704, the contact management system 302 can also form links between mobile device 702 and devices 706 and 708 and push their respective contact info to each of the other mobile devices.

In an embodiment, initiating contacts using a team manager function on the contact management system 302 will cause the contact management system 302 to create an active connection between a new team member (e.g., mobile device 702) and all current members of the team, e.g., mobile devices 704, 706, and 708 (it can create the reciprocal connections without requiring a corresponding connection request from existing team members. The original initiation using the team profile will serve as a persistent connection authorization). If a team member inactivates their connection status with the team, their contact profile will cease being shared with new team members.

In an embodiment, the contact management system 302 can restrict the ability to add/remove members of a team to users having a team lead role. The contact management system 302 may record additional information about the team, such as: team name so that a user can be a member of multiple teams; league; season; season duration; start and end dates; and age restrictions. If a team disbands, the persistent connection authorizations can be deactivated because they are no longer relevant. This may not affect the contact connections that have been created as a result of team membership In another embodiment, initiating contacts using an organization manager function of the contact management system 302 can cause the centralized contact management system 302 to create an active connection between a new organization member and all current members of the organization (e.g., it can create the reciprocal connections without requiring a corresponding connection request from existing organization members). The original initiation using the organization profile can serve as a persistent connection authorization. If an organization or organization member inactivates their connection status with the organization, their contact profile will cease being shared with new organization members. If an organization disbands, the persistent connection authorizations may be deactivated because they are no longer relevant. This may not affect the contact connections that have been previously created as a result of organization membership.

In another embodiment, the contact management system 302 can allow the creation and management of user defined groups of contacts. Groups may be used for a variety of reasons such as Christmas card labels, party invitations, family newsletters, etc. These groups can be propagated to a users' contact repositories as the repository functionality allows.

In another embodiment, the contact management system 302 allows a connector to facilitate the sharing of an introductory party's contact information with one or more recipients known to the connector by creating reciprocal connections. If the introductory party has previously authorized the connector to forward, the connection may be created immediately. If not, the contact management system 302 may request permission from the introductory party to create the connection(s). To formalize the process of introducing the parties to one another, the forwarded message may be accompanied by an explanatory message from the connector. Forwarding types can include Introductory Party to Individual Recipient which allows a connector to create reciprocal connections between an introductory party and a recipient, Introductory Party to Group which allows a connector to create reciprocal connections between an introductory party and each member of a group (of recipients) with a single action or Group to Group which allows a connector to create reciprocal connections between two groups (of recipients) with a single action.

In another embodiment, the contact management system 302 can allows a user to designate certain contacts as part of their family share group. Using the contact management system 302, each family share member then designates their own contacts that they wish to share with other members of the group. Any family share member can update a shared contact, ensuring that all member of the group have updated contact information.

In another embodiment, the contact management system 302 can enable a user to collect and record information sufficient to tentatively initiate a connection with a new acquaintance. Unlike most immediate connections, discreet connections may offer features to temporarily suspend or obfuscate contact initiation: the contact management system 302 can after a defined period of time (e.g., every 12 hours) prompt the user to initiate, cancel or delay the connection request. When initiating a connection, the user will be given the additional option of sharing their actual contact information, or using a temporary profile identity (e.g., a temporary contact management system 302 supplied picture, email address and/or phone number) that can be replaced by their actual contact information at a later time.

Figure 8:
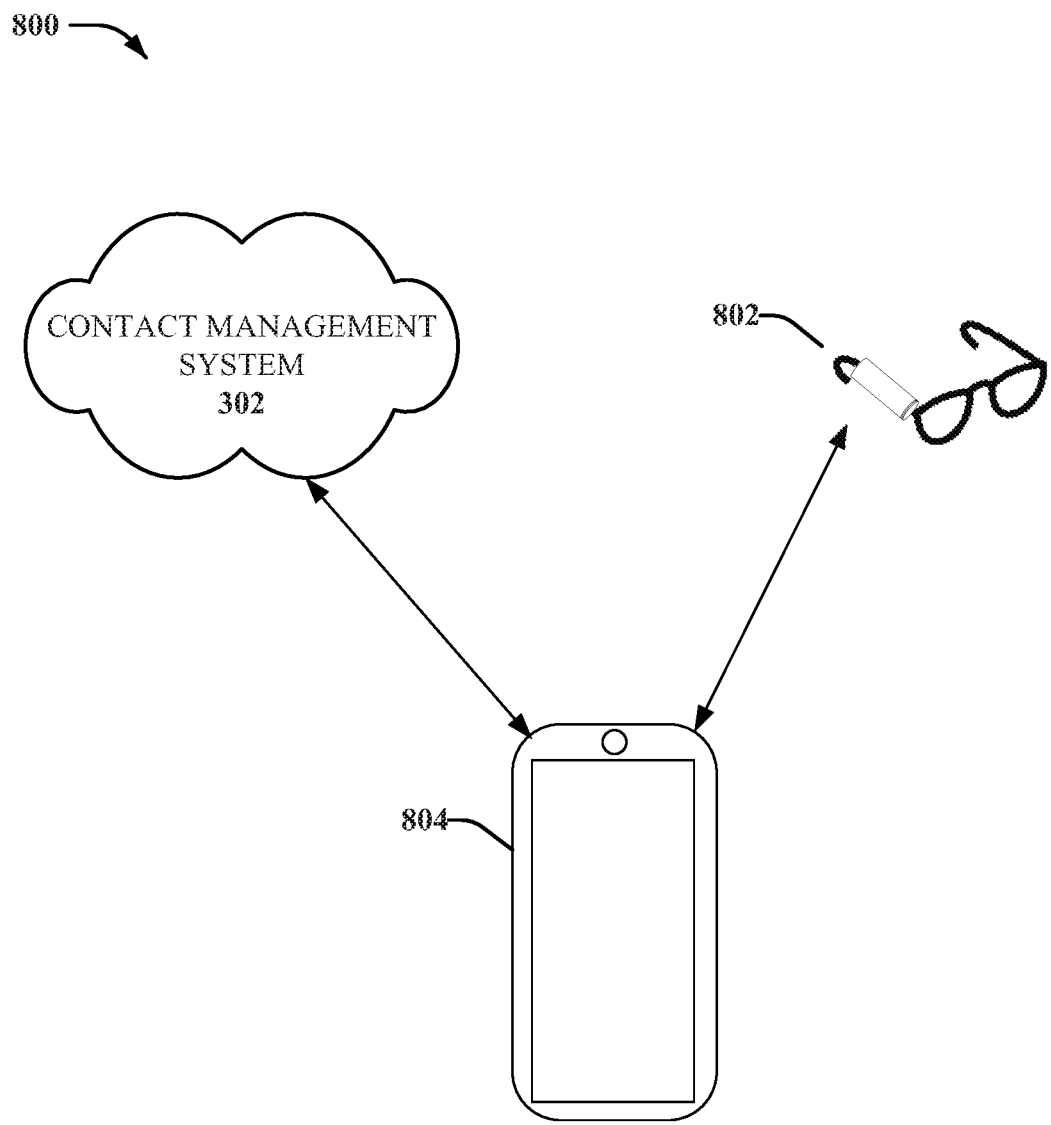
FIG. 8 illustrates an example block diagram of a mobile device and head mounted optical display in accordance with various aspects and embodiments of the subject disclosure.

Turning now to FIG. 8, illustrated is an example block diagram 800 of a mobile device and head mounted optical display device 802 in accordance with various aspects and embodiments of the subject disclosure. The optical head mounted display device 802 can be a device built into glasses as shown in FIG. 8 or could be contact lenses, implantable optical devices and other portable display devices can provide visual interfaces that can facilitate relationship building, provide relationship context, and assist with networking in a business context. The display device 802 could access contact data via the mobile device 804 or via the contact management system 302. The display device 802 can provide visual overlays (e.g., augmented reality) indicating relationship status, relationship history, and other contextual information for individuals within view of the display device 802 wearer. The display device 802 can also have functionality that is triggered in response to gestures, winking/blinking, and voice commands As an example, a person wearing the display device 802 walks into a room, and the display device 802 can identify people, and can determine relationship status based on facial recognition analysis and match the results to contact information. In other embodiments, the display device 802 can determine identities based on broadcast contact information (e.g., via respective devices that broadcast identity information, and etc). In an embodiment, the display device 802 can determine identities based on scanning business cards that are received. Once the display device 802 recognizes the person, the display device 802 can provide contact information, status information, and relationship history, and other relevant information to the wearer using visual, audio, or other transmission methods. The relevant information can include information assessing level of past interaction, quality of interaction (subjective or objective) and other information relevant to facilitating relationship growth or development.

The display device 802 can also gather and display information from one or more social media accounts to show common interests, goals, histories that can be used to facilitate relationship development. The display device 802 and/or mobile device 804 communicably coupled to the display device 802 can be configured to broadcast contact information to one or more people in the line of sight of the display device 802. As an example, the user can look at a person in the room, and the display device 802 can track the eye movements to identify the person being looked at. The display device 802 and/or mobile device 804 can then initiate transmission of contact information to the person. In other embodiments, the display device 802 can track eye movements, blinks, winks, and other gestures in order to transmit contact information, messages, and other contextual information. The user can select which information they want to transmit or broadcast to one or more groups of people. For instance, the user may want to transmit business information to a first group, while transmitting interests and other personal information to a second group.

In an embodiment, the display device 802 can transmit or broadcast information or receive information to or from everybody within a certain radius or within a geofenced area.

In other embodiments, the display device 802 can be used in commercial transactions to provide overlays with information about reviews of products, real estate, and other relevant information. Via augmented reality interactions, the user wearing the display device 802 can also convey interest indications to a merchant and other information to facilitate commercial transactions.

Figure 9:
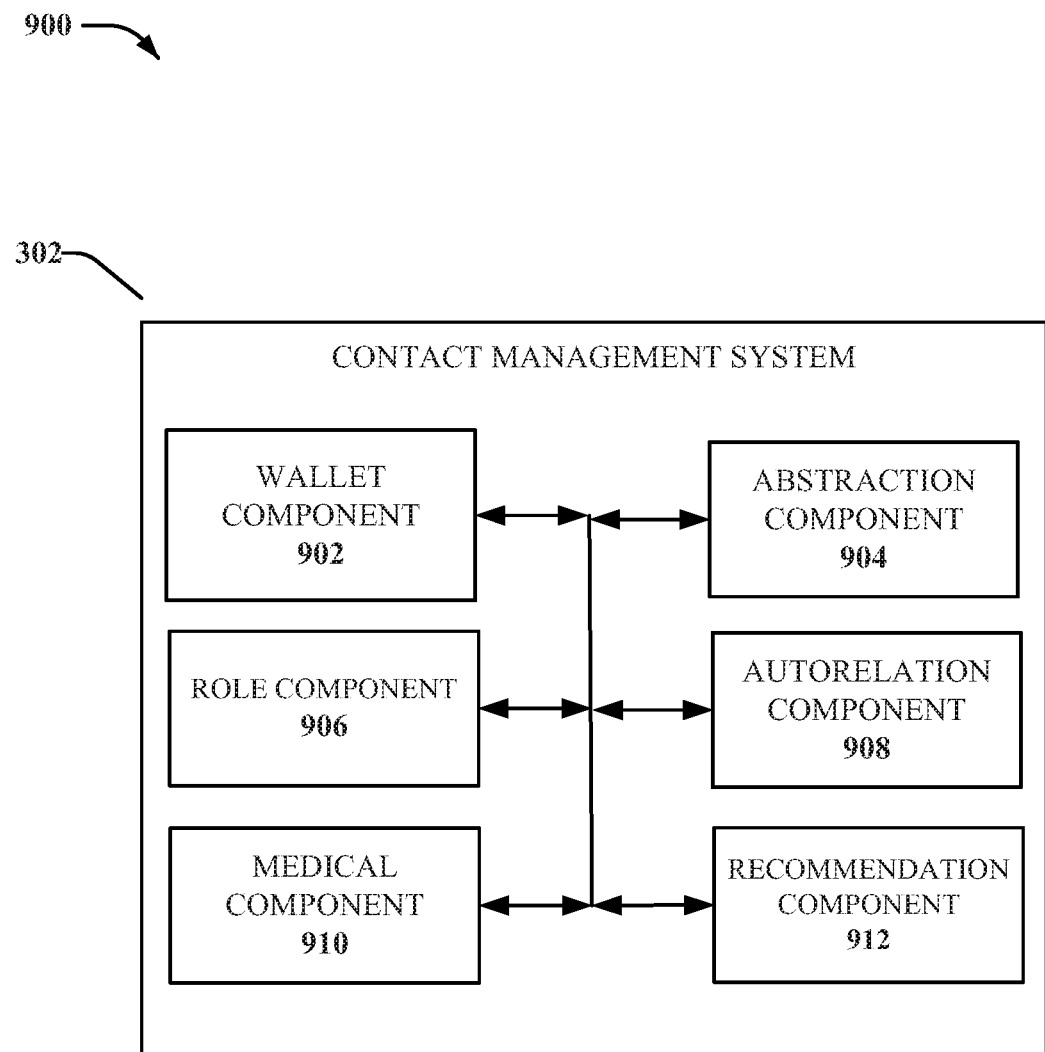
FIG. 9 illustrates another example block diagram of a cloud based contact management system in accordance with various aspects and embodiments of the subject disclosure.

Turning now to FIG. 9, illustrated is another example block diagram 900 of a cloud based contact management system 302 in accordance with various aspects and embodiments of the subject disclosure.

In an embodiment, the contact management system 302 can include a wallet component 902 that can enable a level of abstraction when making payments, where the mobile device can transfer to the payee, some identification information that does not include financial account information in order to make payments.

The level of abstraction can be such that the payer can select which accounts or combination of accounts to make the payment, and then the payee, based on the identification information, can request payment from a server, and the server, using the identification information selects which accounts from which to make the payment. The financial account details therefore can remain hidden from both the payer and the payee.

The level of abstraction can be expanded wherein a person ordering a product or service in person, over the phone, or online, can select an icon on the screen representing the merchant, wherein the merchant information is determined based on location information/NFC or other sensory information (e.g., in the "in person" scenario), from the phone number, or based on the URL. In an embodiment, the payment may be performed once both parties have authorized the transaction.

The wallet component 902 can also select which card or rewards benefit to use during transactions to maximize rewards. The user will not have to select which rewards to use—the system will select anything and everything the user is eligible for. The wallet component 902 can also use peer to peer transactions that are device and application agnostic. For instance, the wallet component 902 can enable a payer to make a payment using a first online payment account using a first provider, while the payee can receive the payment using a second online payment account using a second provider. Similarly, the payments can be device and wallet agnostic, with a payer using a first wallet type, and the payee receiving using a second wallet type.

Authentication can be performed using biometric information such as DNA scan, fingerprint scan, retina scans, and etc received from the mobile device. The authentication can also be performed by looking up permissions and previous transactions in a block chain which can be propagated between the payer and payee. The block chain record can be anonymized, with a layer of abstraction between the block chain ID and the subscriber ID, so that any specific user cannot be tied to the block chain record.

In an embodiment, shipping information or delivery information can automatically be propagated to a merchant or into forms. In some embodiments, this propagation can be performed based on the merchant relationship with the payer.

The wallet component 902 can also receive digital receipts for purchases and other financial transactions. The platform can determine that a transaction has occurred when the transaction is made via the wallet, using the mobile device, when the mobile device is near a POS device, or by receiving an receipt via one of the financial accounts linked to the application. The digital receipts can allow tracking and analysis of expenditures. The receipts can be associated with one or more of the different personas as well, to provide further analysis of the expenditures. Receipts that are associated with a business persona can be tracked an analyzed by the employer, or other entities, while receipts associated with personal personas can be tracked along with other receipts received by personal personas of family members.

The wallet component 902 can determine whether a receipt is associated with a particular persona based on when the transaction occurred, what the transaction was, and/or who was around when the transaction occurred. For instance, if the transaction occurred during a meeting, the platform could see which persona the meeting was associated with, and tag the receipt appropriately. Similarly, the receipt could be tagged as a business expense, if the transaction occurred while nearby a business contact, and vice versa, the receipt could be tagged as a personal expense, if the transaction occurred in the presence of a family member. These tags can be overruled and/or modified upon review to correct any errors. In other embodiments, the wallet component 902 also provide a means by which several people can contribute money to pay a bill. A bill can be received, and each person can contribute money via respective payment methods, cash, wallet account, credit card, etc, and the abstraction layer can combine the payments, agnostic of which platform is being used to make the payment, and transfer the payment to the merchant. From the merchant's perspective, only one payment is received, but from the purchaser's perspective, there can be a set of individual payments.

An abstraction component 904 can be provided to provide a layer of abstraction that can be used to hide personal information from contacts, while acting as a go-between to facilitate communications. The abstraction component 904 can receive a request to initiate a communication with a person, and then initiate a connection to that person without the original requestor knowing the details of how the connection is performed. For instance, if person A wanted to talk to person B, person A could use an app on their mobile device to call person B, but person A, and the mobile device of person A are not directly connecting to person B via their phone number. Instead, the abstraction component 904 can route the incoming request, look up which phone number is associated with person B, and then connect the call via person B's phone number.

The abstraction component 904 can also enable routing communications via one or more modes of communications. Each person can have several associated phone numbers, devices, or means by which they can be reached (text message, voice call, video call, email, and etc). The abstraction component 904 can route the communication to whichever mode or device that is preferred by the recipient. For instance, person B can indicate that they prefer voice calls on a first device during the work day, voice calls, on a second device with a second phone number in the evening, and text messages or emails at night. The abstraction component 904 can thus route communications to the appropriate device depending on the time of day. The abstraction component 904 can also perform voice to text or text to voice translations depending on the mode of communication that is initiated, and that is requested by the recipient.

The abstraction component 904 can also learn preferences based on which device or mode the recipient uses to answer the call. The preferences can take into account whether the contact is a business contact, family contact, and other contextual information. The abstraction component 904 can have a user interface that easily allows connections to be made. The interface can have icons representing pictures of people, and clicking on one or more pictures can automatically initiate two way, or three way communications with the people selected. The abstraction component 904 can take care of routing the communications so that the appropriate devices and modes of communication are selected. The image icons can represent a persona ID linked to a persona of a user. A person can have multiple personas, and can facilitate access to one or more of the personas.

A role component 906 can be provided to provide a layer of abstraction whereby clients and customers, instead of interacting directly with the employees (e.g., by phone calls, emails, etc) the interaction can be routed through the platform, thus the history of the communications can be preserved, and passed down to successive employees. The authority that the employee has to speak for, or act as an agent of the company, is thus based on their ability to communicate via the role-based ID established by the company. Thus from the client's perspective, anybody communicating using the role ID, is assumed to be an authorized representative of the company The role component 906 can also prevent former employees and employees otherwise not authorized to represent the company from communicating with the clients. For instance, if the means of communications with the client is via the role component 906, the abstraction layer can facilitate the communication without any contact information being shared by either party. In this way, employees can be prevented from learning the actual contact information (e.g., phone numbers, email addresses, mailing addresses, etc.) of their contacts, and so when the employee is let go, he/she will be unable to contact the former clients.

The role component 906 can also enable one or more restrictions on communications such as a non-compete agreement and similar contractual obligations. After the terms of the contractual obligation have been met, or any period of prohibited contact have passed, the platform can allow the former employee to once again communicate with the previously restricted class of communicants.

The role component 906 can also enable and/or restrict other activities. Location information can be collected by the mobile device associated with the user, and communications can be allowed or restricted based on whether the mobile device is within a radius of a predetermined location, in a region, or in a geo-fence area. The role component 906 can also restrict communication for certain people who are subject to government limitations (restraining orders, sex offenders) etc. For instance, a sex offender can be prevented by the platform from communicating with minors. Likewise, a person subject to a restraining order can not only be prevented from communicating with specific people, but the platform can also track and compare locations of the person subject to a restraining order, and the target of the restraining order.

An autorelation component 908 can also be provided to facilitate context and determine relationships automatically to allow people to more productively network. The autorelation component 908 can also manage the relationships, providing prompts and reminders to follow up, based on the type of relationship. The autorelation component 908 can determine which types of reminders and the frequency of reminders based on the nature of the relationship, the relative importance of the relationship, personal preferences, and other factors.

In an embodiment, the autorelation component 908 can receive prompts via a mobile device, ear piece, or an optical head mounted display, that a person nearby has one or more shared contacts, interests, relationships, etc, and prompt the conference attendee to introduce themselves to the person. Once a relationship is formed, the autorelation component 908 can manage the relationship, either by automatically performing follow-up contacts, or prompting the attendee to follow up. For instance, the autorelation component 908 can initiate exchanging contact information, thank you notes, birthday greetings, and other forms of contact that can help maintain and/or grow the relationship.

In an embodiment, the autorelation component 908 can also determine the type of relationship and initiate contacts or provide reminders based on the type of relationship. If people have lots of business contacts in common, or are in common industries, the autorelation component 908 can infer that the relationship is a business relationship and provide appropriate reminders and prompts (e.g., schedule lunch meetings once a quarter, etc). If the relationship is a personal or familial relationship, the prompts can reflect the nature of that personal relationship (e.g., birthday greetings, holiday greetings, etc).

The autorelation component 908 can also use preference information to determine the types of prompts, reminders, and contacts to make with the people. The preference information can be stored based on past experiences, or based on social media information associated with the person. If a person's social media account shows that they are a fan of a social media page, the autorelation component 908 can suggest purchasing, or automatically purchase tickets associated with the social media page to help maintain the client relationship.

The autorelation component 908 can also provide a history of the relationship and other context before meetings in order to provide the user with prompts and conversation points. The context can be delivered via emails or notifications on mobile devices, or via other audio or visual means (e.g., headphone, Bluetooth ear pieces, optical head mounted displays, etc). In some embodiments, the autorelation component 908 can provide prompts and reminders and trigger follow-ups via vibrations (e.g., via a wearable device).

A medical component 910 can be provided to track biometric information such as heart rate, glucose levels, blood pressure, temperature, breathing rate, and other biological indicators to disseminate and distribute to medical professionals that are shared contacts. The collected information can be transmitted to a contact that has been preapproved based on previously established patient/caregiver relationships. Other caregivers and medical personnel associated with the established caregiver can also be approved for access to the biometric information. In emergency situations any first responders can also be approved to receive the biometric information based on their roles and personas. Furthermore, medical history information, such as whether the person has diabetes, epilepsy, allergies, and other relevant medical information can be transmitted and/or broadcast to authorized personnel.

In some embodiments, the medical component 910 can be used to select whether some medical information is private and only accessible by authorized caregivers, or whether some medical information is public, and accessible by the broader population. For example, using the medical component 910, a notification can be broadcast to other users that the person has a severe allergy to peanuts, in order to give notice to those around the person. Other credentialed roles can also be provided with other sets of information based on their credentials.

In an embodiment, the medical information and biometric information can be used by the medical personnel to perform triage in emergency situations. For instance, if emergency room staff have a head mounted display device, the medical history and/or biometric information can be displayed on an augmented reality overlay to enable the emergency room staff to quickly see which people need assistance first and to help prioritize service. The augmented reality overlays could also be used by the general public using the publicly available information. For instance, restaurant servers or cafeteria workers can also be provided with head mounted display devices showing augmented reality overlays indicating which people have allergies to avoid serving them allergenic foods. Biometric information can be provided by the medical component 910 upon request or at regular intervals to caregivers. For instance, various biometrics can be provided to doctors throughout the week or during a time period to enable remote diagnosis.

Medical history information can also be released by the medical component 910 when filling out approved medical forms. Rather than filling forms out by hand, electronic medical forms can auto-populate with relevant contact information, insurance information, medical history information. The platform can verify the authenticity of the electronic document via a digital signature or other mechanism in order to authenticate the veracity of the document and authorize the release of the information.

A recommendation component 912 can be provided to use profile information from an online shopper to select which recommendations to display for the shopper. The recommendation component 912 can transfer for example educational background, job history, location information, and other information that can be used to make inferences about an online shopper's tastes, interests, and background to select recommendations that are likely to influence the shopper.

For example, the merchant can determine that the shopper is an engineer, based on work history, education, and etc. Recommendations from other engineers can be selected to display for the online shopper, as those recommendations are probably 'speaking the same language' as the online shopper in a way that a recommendation from an artist or musician is unlikely to do so. The recommendation component 912 can also look at key words and make recommendation selections based on the key words matching the background of the user. For instance, the same engineer may be more likely to make purchases if the recommendations they review contain references to the functionality of the product, or technological aspects of the product. The engineer may not be as interested in aesthetics, depending on the product class In a similar manner, the recommendation component 912 can look to prior purchases made by the shopper and determine which recommendations where reviewed by the shopper and use big data techniques to draw inferences from the types of recommendations likely to influence the shopper. Likewise, the recommendation component 912 can look at a prior shopping history of the shopper and match that to shopping histories of the reviewers.

In another embodiment, the recommendations can be provided and selected by the recommendation component 912. Each user account can have a record of reviews and recommendations made based on past transactions across many different e-commerce sites. When a person is shopping for a product on one site, the Convey platform can populate the reviews with reviews left by other subscribers across different e-commerce sites for the same or similar products. The reviews selected can be based on the similarities in shopping histories, interests, and background as described above. In another embodiment, the recommendation component 912 can preferentially select for display reviews left by trusted reviewers, e.g., personal and/or business contacts or friends of friends and etc.

Figure 10:
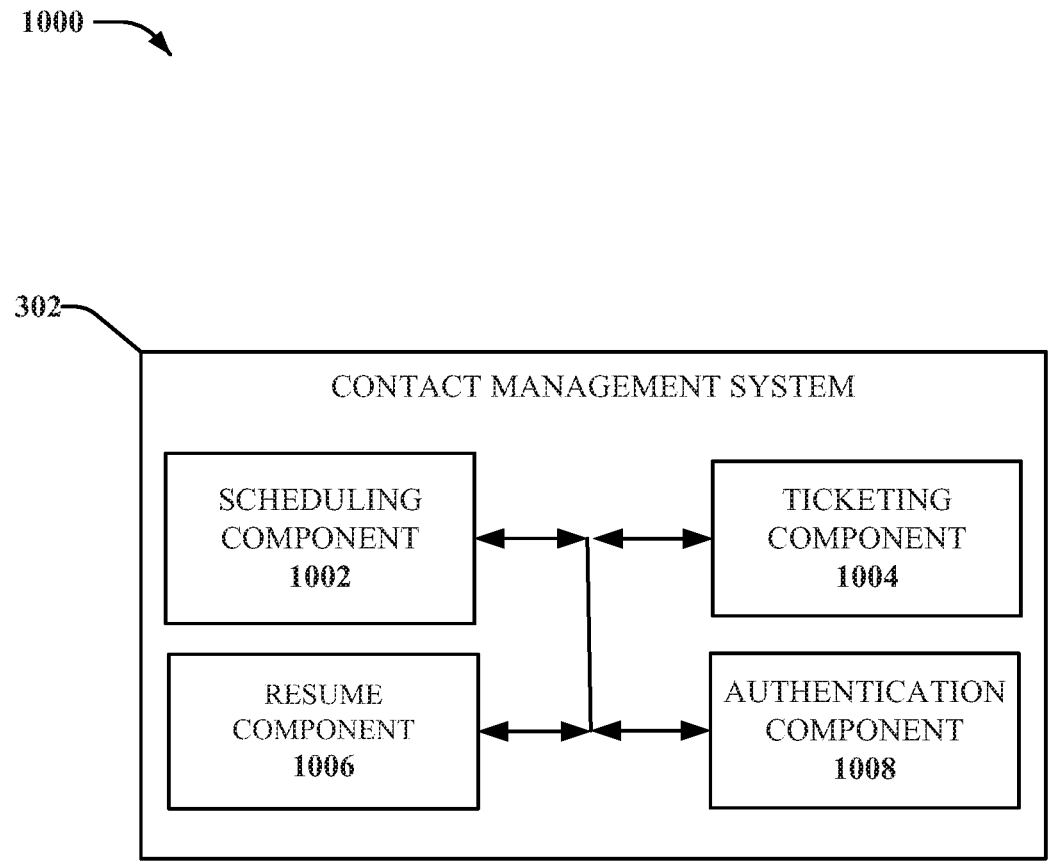
FIG. 10 illustrates another example block diagram of a cloud based contact management system in accordance with various aspects and embodiments of the subject disclosure.

Turning now to FIG. 10, illustrated is another example block diagram 1000 of a cloud based contact management system 302 in accordance with various aspects and embodiments of the subject disclosure.

The cloud based contact management system 302 can also include a scheduling component 1002 that can enable automatic scheduling of events and meetings by leveraging calendar information. This can be particularly useful when scheduling service calls and other similar events. A persona of the contact management system 302 can be granted access to the calendar information to determine when are preferred times to meet, and then share that information with entities who are requesting to meet or provide the service.

Once a meeting is scheduled, access can be provided during the duration of the scheduled event. For instance, for a phone call meeting, the ability to make the phone call can be limited to the time of the scheduled meeting. The scheduling component 1002 can facilitate the phone call being made without knowledge of the actual phone number.

For a service call, access to the home can similarly be provided during the scheduled event. For instance, if maintenance worker is coming to repair a furnace, at 9 am, the scheduling component 1002 can transfer access rights to the maintenance worker profile for a period of time. The access rights can facilitate the unlocking of doors via NFC, Wi-Fi, or other short range communications protocols when the mobile device belonging to the maintenance worker approaches the house.

The scheduling component 1002 can also enable employers to view calendar information for employees in order to distribute and reassign work as appropriate to balance the loads of employees and maintain productivity.

The scheduling component 1002 can also analyze schedules to find trends and make predictions or offer suggestions for preferred meeting times. For instance, if a person tends to schedule doctor appointments in the morning, the platform can determine that future doctor appointments should also be in the mornings.

During meetings, the scheduling component 1002 can also track attendance during meetings, record the meetings, and generate minutes, or notes based on the meetings. Group personas can be created to allow communications between the meeting participants.

In an embodiment, a ticketing component 1004 can be provided to interact with automation systems to allow access to homes and other secured locations. The ticketing component 1004 can also interact with other systems to enable personal preferences to be applied to the system.

As an example for providing access, a door or garage door could automatically open when location information from the device shows that the device is getting near the house. Similarly, based on a user's calendar, or schedule, the car could automatically start 5 minutes before the user is scheduled to leave the house. If a person's calendar shows that they are to arrive home early or later than usual, the ticketing component 1004, could instruct the heat at the house to be turned up at the appropriate time.

Authentication for access can be based on biometric information that is pulled from mobile devices. For instance, fingerprints, or facial recognition scanned or performed by the device, can provide access to a secured location, or can determine which person is present in order to implement preferences. For instance, if husband and wife have different preferences for how a home is to be lit up, or what music is to be played, based on the person determined to be present from the biometric information, the ticketing component 1004 can instruct the home automation to implement the preferences of the person.

The preference information can also be centrally stored and associated with one or more personas or IDs associated with the person. For example, instead of programming seat preferences into each of your cars, the preference information can be conveyed from your mobile device to your car to automatically implement the preferences. In this way, any car that is compatible, can receive the preferences and implement the preferences. This can streamline car rental situations where the mirror settings and seat settings are automatically implemented when you get in the vehicle.

The access and preferences can be expanded beyond just enabling home automation systems and vehicles, but can also be applied to ownership rights to products and services. Digital rights to software and other electronic media can also be enabled by the ticketing component 1004.

A resume component 1006 can be provided to generate resumes based on the work history of the person, and keep the resumes up to date automatically. The resume building system can track events, meetings, and correspondence to determine which projects that the person has worked on are significant, and include those projects and any outcomes in the resume.

The resume component 1006 can also collect feedback from employers, managers, clients, and other people that the person has interacted with and show the feedback in the electronic resume as a record of that person's accomplishments. In this way, the reader of the resume has a basis for trusting the accomplishments of the resume as the feedback can be authenticated by the resume component 1006 as actually originating with the feedback provider.

The feedback collected by the platform can include both formal feedback that is received (such as annual reviews, awards, etc.) but also feedback that is received informally. The informal feedback can include congratulatory emails and in person feedback.

In an embodiment, the resume component 1006 can also tailor resumes to the job that is being applied for. Based on a job description or resumes of similar and/or related jobs, the resume building system can select appropriate achievements and projects to highlight to be more attractive to the potential employer.

The resume component 1006 can also allow a job seeker to search for jobs that they may be qualified for or interested in based on the resume entries. The resume component 1006 can provide search tools that are customizable for both the job seeker and the employer. The employer can also search for resumes that match their requirements.

An authentication component 1008 can also be provided to enable an API to allow organizations to authenticate a user's affiliation with the organization or to authenticate a particular certification held by the user. The authentications can be performed in one of several manners. In one embodiment, a certification from the organization can be displayed as a $3^{rd}$ party badge or other emblem that users can add to their persona card. The persona card can be displayed on a mobile device, and can be equivalent to an electronic business card. Another mobile device viewing the persona card can verify that badge as belonging to the organization stated.

Figure 11:
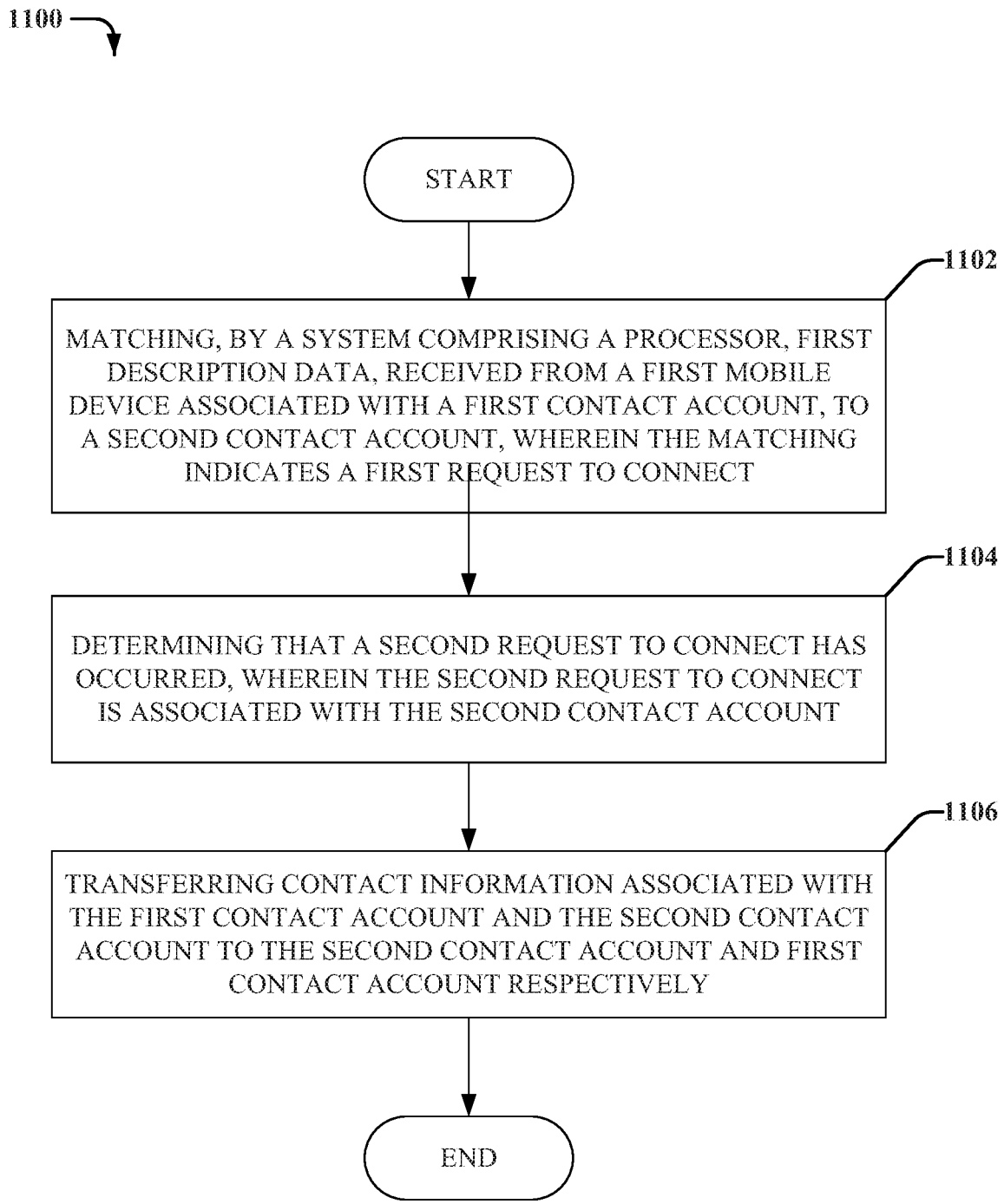
FIG. 11 illustrates an example method for managing contacts in accordance with various aspects and embodiments of the subject disclosure.

The persona card can be in an official (or otherwise organizationally provided) template card format that is accessible only to authorized users. The template can include encoded information (e.g., QR code) that can indicate the authenticity of the template. In other embodiments, the certifications can be displayed in an augmented reality interface that can be in another user's field of vision. A deep learning engine can also automatically highlight only those certifications of a new connection that are relevant to the user. The persona card that has the organizationally provided template can also be used within the organization as an ID to provide access to security/access controlled systems Turning now to FIG. 11, illustrated is an example method 1100 for managing contacts in accordance with various aspects and embodiments of the subject disclosure.

In an embodiment, the method can start at 1102 where the method includes matching, by a system comprising a processor, first description data, received from a first mobile device associated with a first contact account, to a second contact account, wherein the matching indicates a first request to connect (e.g., by matching component 304).

At 1104, the method includes determining that a second request to connect has occurred, wherein the second request to connect is associated with the second contact account (e.g., by confirmation component 306).

At 1106, the method includes transferring contact information associated with the first contact account and the second contact account to the second contact account and first contact account respectively (e.g., by connection component 310).

Figure 12:
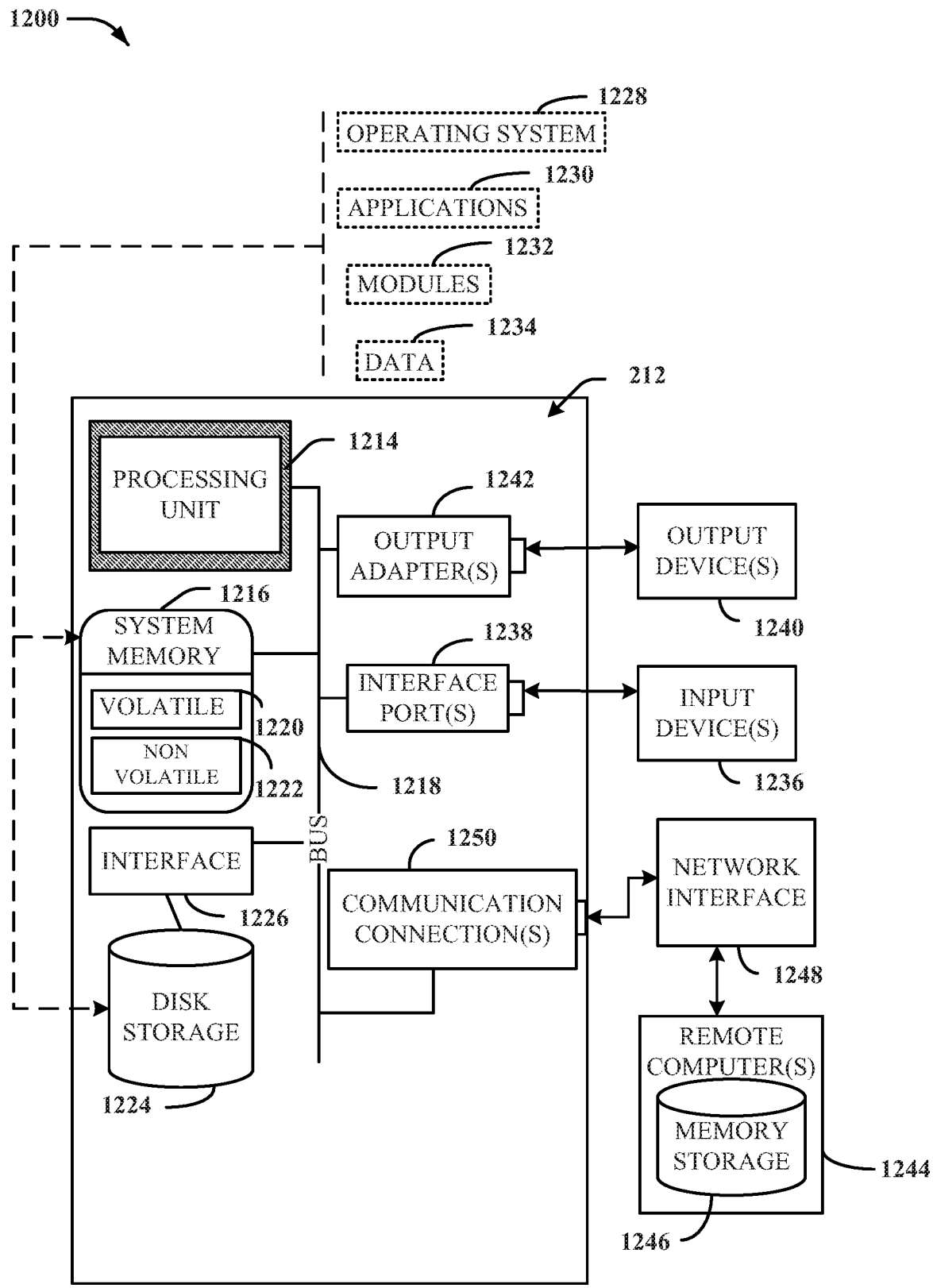
FIG. 12 illustrates an example block diagram of a computer system that can be operable to execute processes and methods in accordance with various aspects and embodiments of the subject disclosure.
Figure 13:
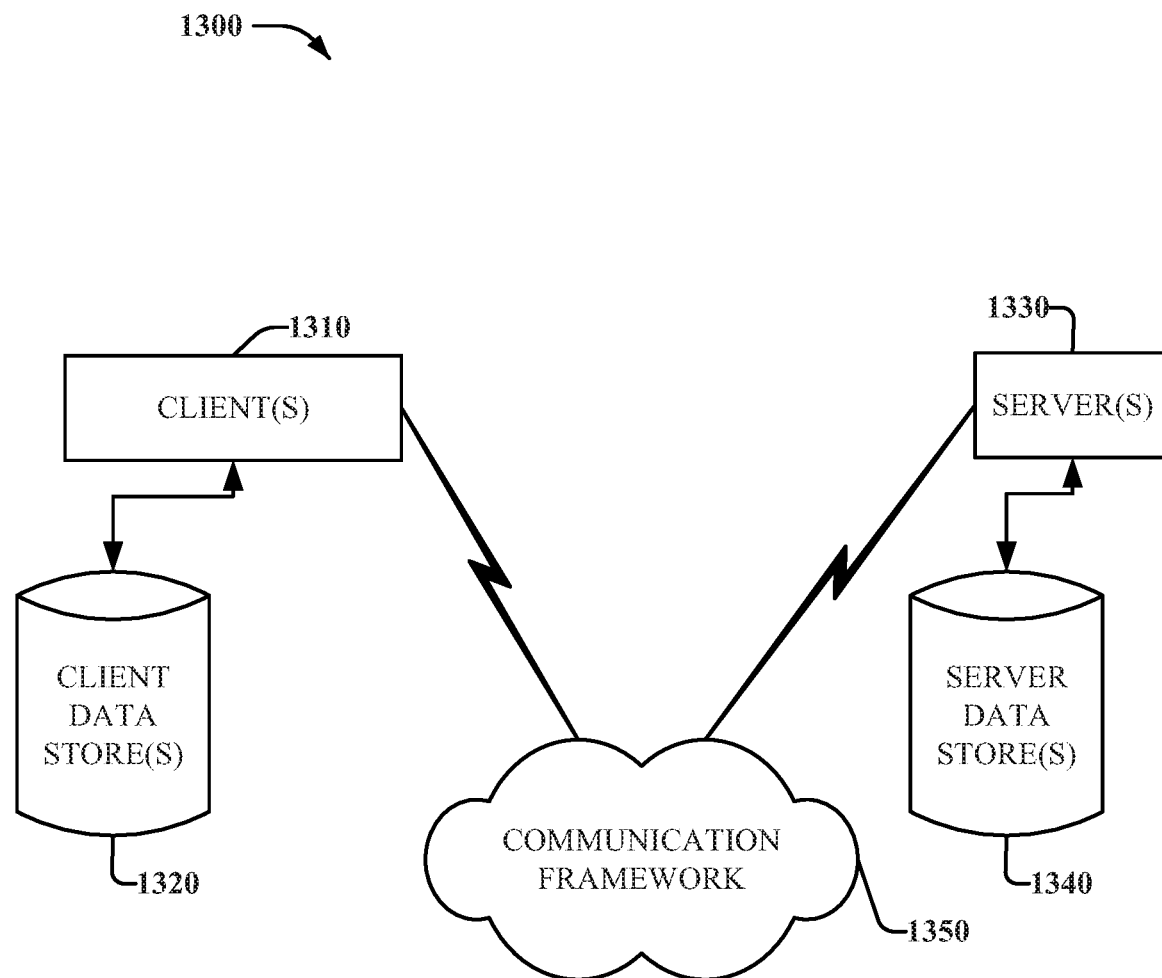
FIG. 13 illustrates an example block diagram of a networking and computing environment in accordance with various aspects and embodiments of the subject disclosure.

In order to provide a context for the various aspects of the disclosed subject matter, FIGS. 12 and 13 as well as the following discussion are intended to provide a brief, general description of a suitable environment in which the various aspects of the disclosed subject matter may be implemented.

With reference to FIG. 12, a suitable environment 1200 for implementing various aspects of this disclosure includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1212 also includes removable/non-removable, volatile/non-volatile computer storage media. FIG. 12 illustrates, for example, a disk storage 1224. Disk storage 1224 includes, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used, such as interface 1226.

FIG. 12 also depicts software that acts as an intermediary between users and the basic computer resources described in the suitable operating environment 1200. Such software includes, for example, an operating system 1228. Operating system 1228, which can be stored on disk storage 1224, acts to control and allocate resources of the computer system 1212. System applications 1230 take advantage of the management of resources by operating system 1228 through program modules 1232 and program data 1234, e.g., stored either in system memory 1216 or on disk storage 1224. It is to be appreciated that this disclosure can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

FIG. 13 is a schematic block diagram of a sample-computing environment 1300 with which the subject matter of this disclosure can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing this disclosure, for example. One possible communication between a client 1310 and a server 1330 may be in the form of a data packet transmitted between two or more computer processes.

The system 1300 includes a communication framework 1350 that can be employed to facilitate communications between the client(s) 1310 and the server(s) 1330. The client(s) 1310 are operatively connected to one or more client data store(s) 1320 that can be employed to store information local to the client(s) 1310. Similarly, the server(s) 1330 are operatively connected to one or more server data store(s) 1340 that can be employed to store information local to the servers 1330.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components, as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A mobile device, comprising:
   a memory having stored thereon computer executable components;
   a processor that executes at least the following computer executable components:
      an initiation component that receives initiation data via a wireless transmission, representative of a first initiation request, from another mobile device; and
      a network component that:
         transmits the initiation data and confirmation data to a contact management server, and
         receives first contact data associated with the other mobile device and an indication that second contact data associated with the mobile device has been shared with the other mobile device, and wherein the first contact data is associated with a first profile of a first entity associated with the other mobile device selected from a plurality of profiles of the first entity based on a first relationship type between the first entity and a second entity associated with the mobile device.

2. The mobile device of claim 1, wherein the initiation data comprises image data.

3. The mobile device of claim 2, further comprising:
   an imaging component that receives the image data from a camera on the mobile device, and analyzes the image data to generate the initiation data associated with the image data.

4. The mobile device of claim 1, further comprising:
   a contact component that updates a contact list based on the first contact data.

5. The mobile device of claim 1, wherein the confirmation data comprises user feedback data indicating acceptance of a connection request.

6. The mobile device of claim 1, wherein the confirmation data comprises location data indicating that a distance between the mobile device and the other mobile device is less than a predefined distance.

7. The mobile device of claim 1, wherein the network component receives modified first contact data associated with the other mobile device based on a change from the first relationship type to a second relationship type between the first entity and the second entity, and wherein the modified first contact data is associated with a second profile of the plurality of profiles of the first entity, and the first relationship type is different from the second relationship type.

8. The mobile device of claim 1, wherein the first relationship type and the second relationship type as at least two of a work relationship, a family relationship, a friend relationship, or a client relationship.

9. The mobile device of claim 1, further comprising:
   a prompting component that sends a prompt in response to determining that the other mobile device is within a predefined range and is associated with a first contact within a predefined degree of separation from a second contact associated with the second contact data.

10. The mobile device of claim 1, wherein the predefined criterion associated with contact sharing is related to a likelihood of contact sharing acceptance.

11. The mobile device of claim 1, wherein the predefined criterion associated with matching the initiation data to saved initiation data corresponds to the second contact data associated with the other mobile device.

12. A method, comprising:
   receiving, by a first mobile device comprising a processor, initiation data via a wireless transmission, representative of a first initiation request, from a second mobile device;
   transmitting, by the first mobile device, the initiation data and confirmation data to a contact management server; and
   receiving, by the first mobile device, first contact data associated with the second mobile device and an indication that second contact data associated with the first mobile device has been shared with the second mobile device, and wherein the first contact data is associated with a first profile of a first entity associated with the second mobile device selected from a plurality of profiles of the first entity based on a first relationship type between the first entity and a second entity associated with the first mobile device.

13. The method of claim 12, further comprising:
   receiving, by the first mobile device, image data from a camera on the first mobile device, and analyzing the image data to generate the initiation data.

14. The method of claim 12, further comprising:
   updating, by the first mobile device, a contact list based on the first contact data.

15. The method of claim 12, wherein the confirmation data comprises user feedback data indicating acceptance of a connection request.

16. The method of claim 12, wherein the confirmation data comprises location data indicating that a distance between the first mobile device and the second mobile device is less than a predefined distance.

17. The method of claim 12, wherein the confirmation data comprises connection data indicating that the first contact associated with the first mobile device is within a predefined degree of separation from a second contact associated with the second mobile device.

18. A non-transitory computer readable medium having instructions stored thereon that, in response to execution, cause a first mobile device comprising a processor to perform operations comprising:
- receiving initiation data via a wireless transmission, representative of a first initiation request, from a second mobile device;
- transmitting the initiation data and confirmation data to a contact management server; and
- receiving first contact data associated with the second mobile device and an indication that second contact data associated with the first mobile device has been shared with the second mobile device, and wherein the first contact data is associated with a first profile of a first entity associated with the second mobile device selected from a plurality of profiles of the first entity based on a first relationship type between the first entity and a second entity associated with the first mobile device.

19. The non-transitory computer program product of claim 18, wherein the confirmation data comprises connection data indicating that the first contact associated with the first mobile device is within a predefined degree of separation from a second contact associated with the second mobile device.

20. The non-transitory computer program product of claim 18, wherein the operations further comprise:
- receiving image data from a camera on the first mobile device, and analyzing the image data to generate the initiation data.

* * * * *